(12) United States Patent
Hu et al.

(10) Patent No.: US 12,153,245 B2
(45) Date of Patent: Nov. 26, 2024

(54) OPTICAL CONSTRUCTION

(71) Applicant: 3M INNOVATIVE PROPERTIES COMPANY, St. Paul, MN (US)

(72) Inventors: Zhe Hu, Suzhou (CN); Mingxing Wang, Shenzhen (CN); Tuhua Chen, Dongguan (CN); Zhiping Liu, Guangzhou (CN); Yang Liu, Huizhou (CN); Xiulong Men, Huizhou (CN); Hailiang Hou, Suzhou (CN); Huijie Xie, Beijing (CN); Yifei Zheng, Dongcheng (CN); Feng Zhao, Shanghai (CN); Jingfei Chen, Shanghai (CN); Bharat R. Acharya, Woodbury, MN (US); Quinn D. Sanford, Mosinee, WI (US); Matthew S. Cole, Woodbury, MN (US); Tao Zhang, Shenzhen (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/025,988

(22) PCT Filed: Sep. 18, 2020

(86) PCT No.: PCT/CN2020/116214
§ 371 (c)(1),
(2) Date: Mar. 13, 2023

(87) PCT Pub. No.: WO2022/056843
PCT Pub. Date: Mar. 24, 2022

(65) Prior Publication Data
US 2023/0367057 A1    Nov. 16, 2023

(51) Int. Cl.
*G06V 40/13*    (2022.01)
*F21V 8/00*    (2006.01)
(Continued)

(52) U.S. Cl.
CPC .......... *G02B 6/0055* (2013.01); *G06V 40/13* (2022.01); *G02B 27/14* (2013.01); *G02F 1/13338* (2013.01)

(58) Field of Classification Search
None
See application file for complete search history.

(56) References Cited

U.S. PATENT DOCUMENTS

| 5,882,774 A | 3/1999 | Jonza et al. |
| 11,281,039 B2 | 3/2022 | Zhou et al. |

(Continued)

FOREIGN PATENT DOCUMENTS

| CN | 209000039 U | 6/2019 |
| CN | 110991407 A | 4/2020 |

(Continued)

OTHER PUBLICATIONS

International Search Report for PCT International Application No. PCT/CN2020/116214, mailed on May 28, 2021, 6 pages.

*Primary Examiner* — Joseph R Haley
(74) *Attorney, Agent, or Firm* — Robert S. Moshrefzadeh

(57) ABSTRACT

An optical construction (100) includes a lightguide (102), a transmissive reflector (112), and an optical sensor (114). The lightguide (102) includes a first major surface (104) and a second major surface (106) opposite to the first major surface (104). The first major surface (104) includes a first portion (108) and an adjoining second portion (110). The transmissive reflector (112) is disposed adjacent to the first major surface (104) of the lightguide (102). The optical sensor (114) is disposed adjacent to the transmissive reflector (112) opposite to the lightguide (102). The optical sensor (114) is aligned with the first portion (108) of the first major surface (104) of the lightguide (102), such that the optical sensor (114) receives at least a portion of light passing through the first portion (108) of the first major surface (104)

(Continued)

and transmitted by the transmissive reflector (112). The optical construction (100) further includes an enclosed gap (116) disposed between the first portion (108) of the first major surface (104) of the lightguide (102) and the transmissive reflector (112).

6 Claims, 20 Drawing Sheets

(51) Int. Cl.
*G02B 27/14* (2006.01)
*G02F 1/1333* (2006.01)

(56) References Cited

U.S. PATENT DOCUMENTS

| | | | |
|---|---|---|---|
| 2020/0057340 A1* | 2/2020 | Jiang | G02F 1/13338 |
| 2021/0124895 A1* | 4/2021 | Xiong | H05K 1/0281 |
| 2021/0216741 A1* | 7/2021 | Zhang | G06V 10/54 |

FOREIGN PATENT DOCUMENTS

| | | |
|---|---|---|
| CN | 210401950 U | 4/2020 |
| CN | 211124083 U | 7/2020 |
| JP | 10232910 A | 9/1998 |
| WO | 2017063120 A1 | 4/2017 |
| WO | 2020177032 A1 | 9/2020 |

\* cited by examiner

OPTICAL CONSTRUCTION

CROSS REFERENCE TO RELATED APPLICATIONS

This application is a national stage filing under 35 U.S.C. 371 of PCT/CN2020/116214, filed Sep. 18, 2020, the disclosure of which is incorporated by reference in its entirety herein.

TECHNICAL FIELD

The present disclosure relates generally to an optical construction, and in particular, to an optical construction for an electronic device.

BACKGROUND

Electronic devices, such as smart phones, tablet computers, personal computers, music players or navigators, can be equipped with biometric authentication features, such as fingerprint sensors. In some cases, the fingerprint sensors are incorporated under a display of the electronic devices, and are referred to as under-the-display fingerprint sensors. The under-the-display fingerprint sensors turn a defined area of the display into a fingerprint sensor, thereby eliminating the need for a separate physical fingerprint sensor.

SUMMARY

In a first aspect, the present disclosure provides an optical construction including a lightguide, a transmissive reflector, an optical sensor, and an enclosed gap. The lightguide includes a first major surface and a second major surface opposite to the first major surface. The first major surface of the lightguide includes a first portion and an adjoining second portion. The transmissive reflector is disposed adjacent to the first major surface of the lightguide. The transmissive reflector substantially reflects light in a first wavelength range and substantially transmits light in a second wavelength range. The optical sensor is disposed adjacent to the transmissive reflector opposite to the lightguide. The optical sensor is aligned with the first portion of the first major surface of the lightguide, such that the optical sensor receives at least a portion of light passing through the first portion of the first major surface and transmitted by the transmissive reflector. The enclosed gap is disposed between the first portion of the first major surface of the lightguide and the transmissive reflector, such that light received by the optical sensor passes through the enclosed gap.

In a second aspect, the present disclosure provides an optical construction including a lightguide, a transmissive reflector, an optical sensor, and a spacer member. The lightguide includes a first major surface and a second major surface opposite to the first major surface. The first major surface of the lightguide includes a continuous edge. The transmissive reflector is disposed adjacent to the first major surface of the lightguide. The transmissive reflector substantially reflects light in a first wavelength range and substantially transmits light in a second wavelength range. The optical sensor is disposed adjacent to the transmissive reflector opposite to the lightguide. The optical sensor receives at least a portion of light transmitted by the transmissive reflector. The spacer member is disposed at least partially between the first major surface of the lightguide and the transmissive reflector. The spacer member engages the first major surface of the lightguide and the transmissive reflector. The spacer member extends along the continuous edge of the first major surface, such that an enclosed gap is provided between the first major surface of the lightguide and the transmissive reflector.

In a third aspect, the present disclosure provides an optical construction including a lightguide, a transmissive reflector, an optical sensor, and a frame. The lightguide includes a first major surface and a second major surface opposite to the first major surface. The first major surface of the lightguide includes a continuous edge. The transmissive reflector is disposed adjacent to the first major surface of the lightguide. The transmissive reflector substantially reflects light in a first wavelength range and substantially transmits light in a second wavelength range. The optical sensor is disposed adjacent to the transmissive reflector opposite to the lightguide. The optical sensor receives at least a portion of light transmitted by the transmissive reflector. The frame is disposed between the transmissive reflector and the optical sensor. The frame defines an opening extending through the frame and aligned with the optical sensor, such that light received by the optical sensor passes through the opening. The frame includes a wall extending beyond the transmissive reflector and engaging the first major surface of the lightguide along the continuous edge, such that an enclosed gap is provided between the first major surface of the lightguide and the transmissive reflector.

In a fourth aspect, the present disclosure provides an optical construction including a transmissive reflector, an optical sensor, and a frame. The transmissive reflector includes a first major surface, a second major surface opposite to the first major surface, and a curved portion. The transmissive reflector substantially reflects light in a first wavelength range and substantially transmits light in a second wavelength range. The optical sensor is disposed adjacent to the first major surface of the transmissive reflector and aligned with the curved portion of the transmissive reflector, such that the optical sensor receives at least a portion of light transmitted by the transmissive reflector through the curved portion. The frame is disposed between the transmissive reflector and the optical sensor. The frame defines an opening extending through the frame. The opening is aligned with the optical sensor, such that light received by the optical sensor passes through the opening. The frame includes a stepped portion extending away from the transmissive reflector. The curved portion of the transmissive reflector curves towards and engages the frame, such that an enclosed gap is disposed between the curved portion of the transmissive reflector and the frame. The enclosed gap is aligned with the opening of the frame, such that light received by the optical sensor passes through the enclosed gap.

In a fifth aspect, the present disclosure provides an optical construction including a transmissive reflector, an optical sensor, a frame, and a tape. The transmissive reflector includes a first major surface and a second major surface opposite to the first major surface. The transmissive reflector substantially reflects light in a first wavelength range and substantially transmits light in a second wavelength range. The optical sensor is disposed adjacent to the first major surface of the transmissive reflector. The optical sensor receives at least a portion of light transmitted by the transmissive reflector. The frame is disposed between the transmissive reflector and the optical sensor. The frame defines an opening extending through the frame. The opening is aligned with the optical sensor, such that light received by the optical sensor passes through the opening. The tape is disposed between and engages the transmissive reflector and the frame, such that an enclosed gap is provided between the first major surface of the transmissive reflector and the frame.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1A:
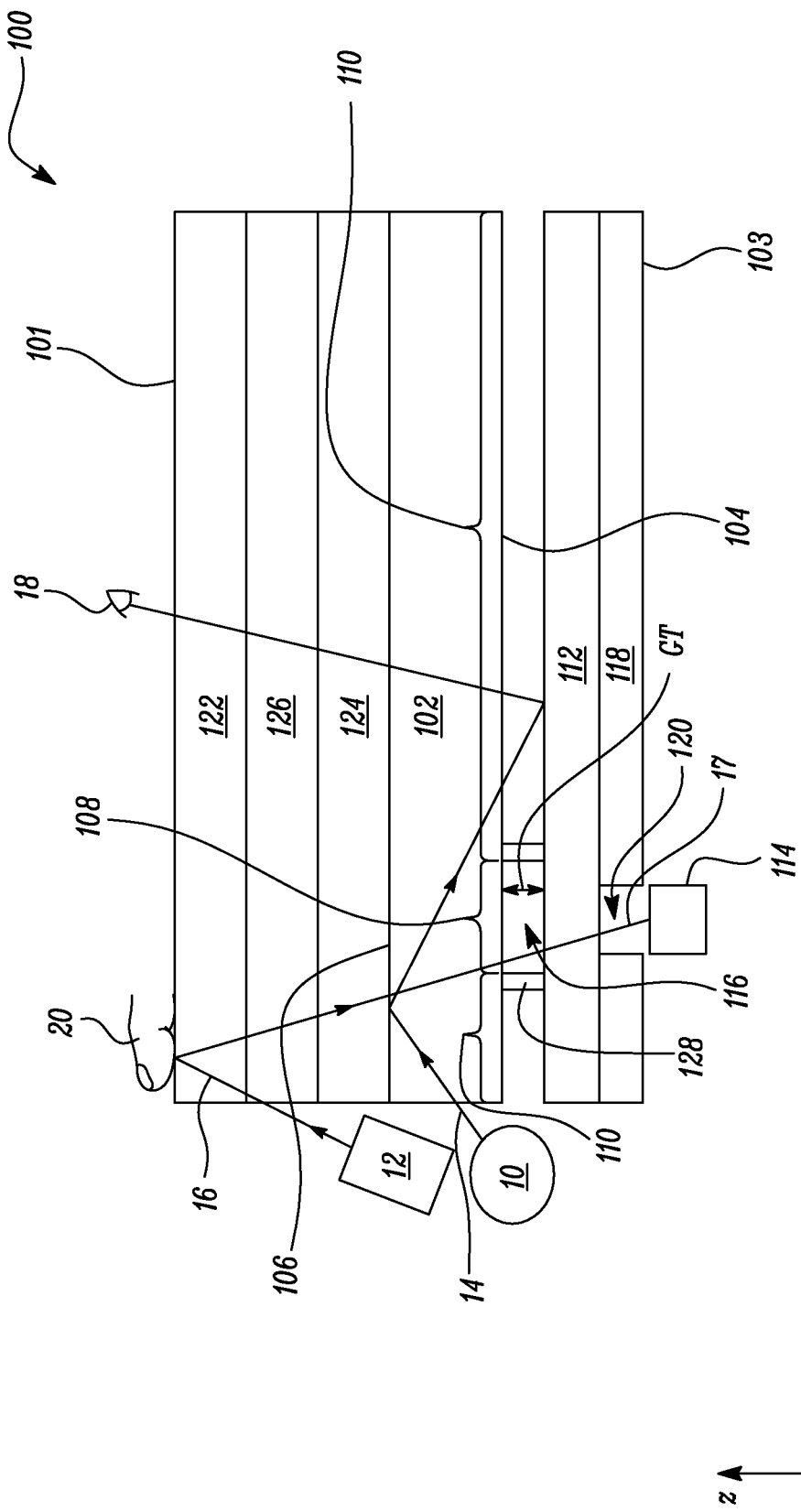
FIG. 1A shows a sectional schematic view of an optical construction according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense. The present disclosure relates to an optical construction. The optical construction may be used in electronic devices that include displays, such as computer monitors, televisions, mobile phones, personal digital assistants (PDAs), wearable devices and other portable devices. Such electronic devices may be equipped with biometric authentication features, for example, fingerprint sensors.

The optical construction includes a lightguide, a transmissive reflector and an optical sensor. The optical sensor may be a fingerprint sensor. The lightguide includes a first major surface and a second major surface opposite to the first major surface. The transmissive reflector is disposed adjacent to the first major surface of the lightguide. The transmissive reflector substantially reflects light in a first wavelength range and substantially transmits light in a second wavelength range. The optical sensor is disposed adjacent to the transmissive reflector opposite to the lightguide. Furthermore, the optical construction also includes an enclosed gap disposed between the first major surface of the lightguide and the transmissive reflector, such that light received by the optical sensor passes through the enclosed gap.

During fingerprint sensing in an electronic device, the lightguide and the transmissive reflector of the optical construction may contact each other at one or more points. This may cause an interference phenomenon known as Newton's Ring. Newton's Rings is generally observed as an interference pattern. Since the transmissive reflector and the lightguide generally not have haze coating for shielding, the interference pattern may be observed easily. At least a portion of a fingerprint may be similar to the interference pattern. Hence, the generation of the interference pattern may affect fingerprint identification and reduce the accuracy and efficiency of the fingerprint sensing of the electronic device. Further, using an algorithm to distinguish the portion of the fingerprint from the interference pattern may further affect the accuracy and efficiency of the fingerprint sensing.

The inclusion of the enclosed gap between the lightguide and the transmissive reflector may avoid any contact between the lightguide and the transmissive reflector at least in an area around the optical sensor. Thus, the enclosed gap between the lightguide and the transmissive reflector may prevent generation of Newton's rings during fingerprint sensing. Therefore, the optical construction of the present disclosure may ensure accuracy of fingerprint sensing in the electronic device.

The optical construction may also include a frame disposed between the transmissive reflector and the optical sensor. In some embodiments of the present disclosure, an enclosed gap may alternatively or additionally be provided between the transmissive reflector and the frame.

Figure 1B:
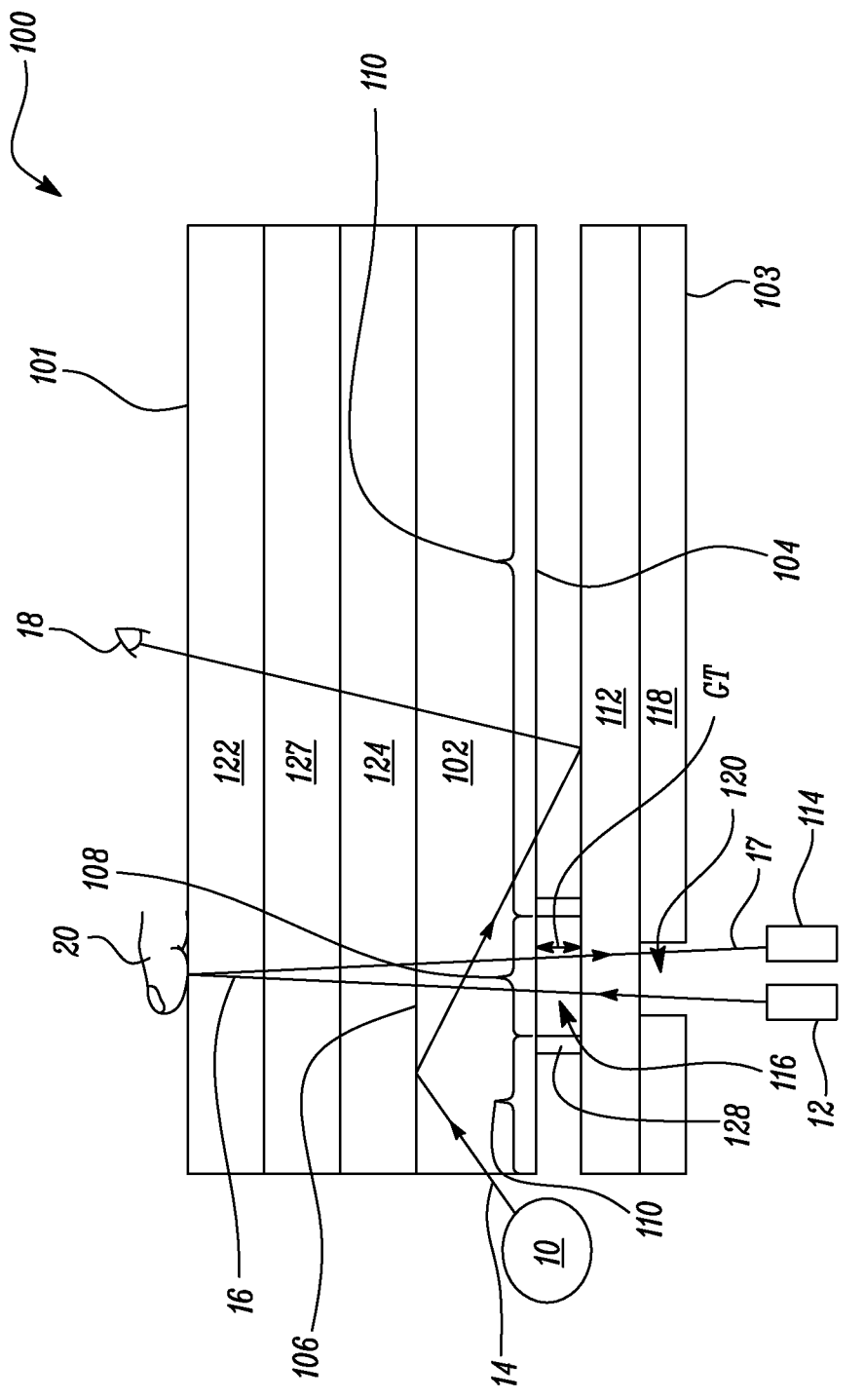
FIG. 1B shows a sectional schematic view of an optical construction according to another embodiment of the present disclosure.

Referring now to FIGS. 1A and 1B, an optical construction 100 is illustrated according to an embodiment provided in the disclosure. The optical construction 100 defines mutually orthogonal x, y, and z-axes. The x and y-axes are in-plane axes of the optical construction 100, while the z-axis is a transverse axis disposed along a thickness of the optical construction 100. In other words, the x and y-axes are disposed along a plane of the optical construction 100, while the z-axis is perpendicular to the plane of the optical construction 100.

The optical construction 100 includes a lightguide 102, a transmissive reflector 112, an optical sensor 114, and an enclosed gap 116. The lightguide 102, the transmissive reflector 112, the optical sensor 114, and the enclosed gap 116 of the optical construction 100 are disposed adjacent to each other along the z-axis. In some embodiments, the lightguide 102 and the transmissive reflector 112 are bonded together, for example, by means of an optical adhesive, epoxy, lamination, or any other suitable method of attachment. The optical construction 100 further includes a top surface 101 facing a user 18 and a bottom surface 103 opposite to the top surface 101. The optical sensor 114 is disposed proximal to the bottom surface 103 of the optical construction 100.

The lightguide 102 includes a first major surface 104 and a second major surface 106 opposite to the first major surface 104. The first major surface 104 includes a first portion 108 and an adjoining second portion 110. In some embodiments, each of first major surface 104 and the second major surface 106 may be substantially planar. Further, the first and second major surfaces 104, 106 of the lightguide 102 are substantially disposed along the x-y plane.

The optical construction 100 further includes at least one first light source 10 emitting light in a first wavelength range and at least one second light source 12 emitting light in a second wavelength range.

FIG. 1A illustrates the second light source 12 disposed proximal to an edge surface of the optical construction 100. FIG. 1B illustrates the second light source 12 disposed proximal to the optical sensor 114. One second light source 12 is illustrated in both FIGS. 1A and 1B. However, in some embodiments, the optical construction 100 may include multiple second light sources 12. For example, one second light source 12 may be disposed proximal to the edge surface of the optical construction 100, while another second light source 12 may be disposed proximal to the bottom surface 103 of the optical construction 100.

In some embodiments, the first light source 10 is a visible light source. In some embodiments, the first light source 10 includes one or more light emitters which emit light. The light emitters may be, for example, light emitting diodes (LEDs), fluorescent lights, or any other suitable light emitting devices. In some embodiments, the second light source 12 is an infrared light source. The second light source 12 may aid the optical sensor 114 in detecting a fingerprint.

In the illustrated embodiment of FIG. 1A, the first light source 10 is disposed in an edge-lit configuration proximal to the edge surface of the optical construction 100. However, in some other embodiments, the first light source 10 may be disposed in a back-lit configuration proximal to the bottom surface 103 of the optical construction 100. In some embodiments, the optical construction 100 may include multiple first light sources 10 disposed in edge-lit and/or back-lit configurations.

The first light source 10 is configured to emit a first light 14 in the first wavelength range towards the lightguide 102. The second light source 12 is configured to emit a second light 16 in the second wavelength range towards a top surface 101 of the optical construction 100. The second light source 12 may be positioned such that the second light source 12 emits the second light 16 in a suitable direction.

In some embodiments, the lightguide 102 may be a solid lightguide. In some embodiments, the lightguide 102 may use total internal reflection (TIR) to transport or guide the first light 14 from the first light source 10, located proximal to the edge surface of the optical construction 100, towards the user 18. In some cases, the lightguide 102 may improve uniformity of the first light 14 emitted by the optical construction 100.

The transmissive reflector 112 is disposed adjacent to the first major surface 104 of the lightguide 102. The transmissive reflector 112 substantially reflects light in the first wavelength range and substantially transmits light in the second wavelength range. In some embodiments, the transmissive reflector 112 may have a reflectance for light in the first wavelength range of at least 80%, at least 90%, at least 95%, at least 98%, or at least 99%. The reflectance may be an average reflectance in the first wavelength range for substantially normally incident light. In some embodiments, the transmissive reflector 112 may have a transmittance for light in the second wavelength range of at least 80%, at least 90%, at least 95%, at least 98%, or at least 99%. The transmittance may be an average transmittance in the second wavelength range for substantially normally incident light. In some embodiments, the first wavelength range is a visible wavelength range extending from about 450 nanometers (nm) to about 650 nm or from about 400 nm to about 700 nm. In some embodiments, the second wavelength range is an infrared wavelength range extending from about 700 nm to about 1000 nm or from about 750 nm to about 1000 nm. In some embodiments, the transmissive reflector 112 may have a multi-layer configuration. In some embodiments, transmissive reflector 112 may include one or more of perforated mirrors, microstructured films, and so forth.

The optical sensor 114 is disposed adjacent to the transmissive reflector 112 opposite to the lightguide 102. The optical sensor 114 is aligned with the first portion 108 of the first major surface 104 of the lightguide 102, such that the optical sensor 114 receives at least a portion of light passing through the first portion 108 of the first major surface 104 and transmitted by the transmissive reflector 112. Specifically, the optical sensor 114 may receive at least a portion of a light 17 that travels through the first portion 108 of the first major surface 104 and is transmitted by the transmissive reflector 112. The light 17 may be a portion of the second light 16 that is reflected from a finger 20 placed on the top surface 101 of the optical construction 100. In the illustrated embodiment of FIGS. 1A and 1B, the optical sensor 114 is an infrared sensor.

The optical construction 100 further includes a frame 118 disposed between the transmissive reflector 112 and the optical sensor 114. In some embodiments, the frame 118 and the transmissive reflector 112 are bonded together, for example, by means of an optical adhesive, epoxy, lamination, or any other suitable method of attachment.

The frame 118 defines an opening 120 extending through the frame 118 and aligned with the optical sensor 114, such that light received by the optical sensor 114 passes through the opening 120. Specifically, the light 17 received by the optical sensor 114 passes through the opening 120. The opening 120 may have any suitable shape, for example, circular, polygonal, oval, and so forth. In some embodiments, the frame 118 may be a casing or housing of an electronic device in which the optical construction 100 is incorporated. The frame 118 may be made of a metal or a metallic alloy. The frame 118 may define the bottom surface 103 of the optical construction 100.

In the illustrated embodiment of FIG. 1A, the optical construction 100 further includes a display panel 122, an optical diffuser 124 and a reflective polarizer 126. In the illustrated embodiment of FIG. 1B, the optical construction 100 includes a brightness enhancement film 127 instead of the reflective polarizer 126.

Referring to FIG. 1A, the display panel 122 is disposed adjacent to the second major surface 106 of the lightguide 102 opposite to the transmissive reflector 112. In some embodiments, the display panel 122 may include an organic light emitting diode (OLED) display panel. In some other embodiments, the display panel 122 may include a liquid crystal display (LCD) panel. In some embodiments, the display panel 122 and the reflective polarizer 126 are bonded together, for example, by means of an optical adhesive, epoxy, lamination, or any other suitable method of attachment. The display panel 122 may define the top surface 101 of the optical construction 100.

The optical diffuser 124 is disposed between the display panel 122 and the lightguide 102. The optical diffuser 124 may diffuse the first and second lights 14, 16 received from the first and second light sources 10, 12, respectively. This may increase uniformity of illumination light incident on the display panel 122. Consequently, this may result in an image perceived by the user 18 to be uniformly bright. In some embodiments, the optical diffuser 124 may include an adhesive layer for bonding with another layer or film.

The reflective polarizer 126 is disposed between the display panel 122 and the optical diffuser 124. The reflective polarizer 126 may allow light waves of a specific polarization to pass through while blocking light waves of other polarizations. In some embodiments, the reflective polarizer 126 may include one or more of a polymeric reflective polarizer, a wire grid reflective polarizer, and a diffuse reflective polarizer. In some embodiments, the reflective polarizer 126 is a linear reflective polarizer. In some other embodiments, the reflective polarizer 126 may be a circular reflective polarizer. In some embodiments, the reflective polarizer 126 may include a plurality of layers (not shown). In some embodiments, the plurality of layers of the reflective polarizer 126 may number greater than about 30 in total. In some embodiments, the plurality of layers of the reflective polarizer 126 may number greater than about 50 in total.

In the illustrated embodiment of FIG. 1B, the optical construction 100 further includes the brightness enhancement film 127 disposed between the display panel 122 and the optical diffuser 124. In some embodiments, the brightness enhancement film 127 is a micro-replicated enhancement film that utilizes a prismatic structure to provide a substantial amount of brightness gain. The brightness enhancement film 127 may include a plurality of linear prisms. In some embodiments, the brightness enhancement film 127 may be a custom designed prism array molded, embossed, or cast in an optically transparent material, such as acrylic, polyester or polycarbonate. In some embodiments, the brightness enhancement film 127 may be a crossed prismatic film having two prismatic films arranged such that the two prismatic films are rotated 90 degrees relative to one another.

In some embodiments, the optical construction 100 may also include an absorbing polarizer (not shown), a retarder (not shown), etc. Referring to FIG. 1A, the display panel 122, the reflective polarizer 126, the optical diffuser 124, the lightguide 102, the transmissive reflector 112, the optical sensor 114 and the frame 118 are disposed adjacent to each other along the z-axis. Referring to FIG. 1B, the display panel 122, the brightness enhancement film 127, the optical diffuser 124, the lightguide 102, the transmissive reflector 112, the optical sensor 114 and the frame 118 are disposed adjacent to each other along the z-axis.

In some embodiments, the second light source 12 may be disposed on one side of the lightguide 102, as illustrated in FIG. 1A. In some other embodiments, the second light source 12 may be disposed below the frame 118 and adjacent to the optical sensor 114, as illustrated in FIG. 1B.

Referring again to FIGS. 1A and 1B, the enclosed gap 116 is disposed between the first portion 108 of the first major surface 104 of the lightguide 102 and the transmissive reflector 112, such that light received by the optical sensor 114 passes through the enclosed gap 116. Specifically, the light 17 received by the optical sensor 114 passes through the enclosed gap 116. In some embodiments, the enclosed gap 116 may be an air gap. In some other embodiments, the enclosed gap 116 may be a vacuum or a partial vacuum. The enclosed gap 116 has a thickness "GT". In some embodiments, the thickness "GT" of the enclosed gap 116 is from about 2 microns to about 200 microns. In some embodiments, the thickness "GT" of the enclosed gap 116 is about 50 microns. In some embodiments, the thickness "GT" of the enclosed gap 116 is about 100 microns. The thickness "GT" of the enclosed gap 116 may vary as per application attributes.

When the finger 20 is placed on the display panel 122 of the optical construction 100, the finger 20 reflects light emitted by the display panel 122 and/or the second light 16 emitted by the second light source 12. The reflected light travels through the display panel 122 before reaching the lightguide 102, the transmissive reflector 112 and the optical sensor 114. Specifically, the second light 16 emitted by the second light source 12 may be at least partially reflected by the finger 20 to generate the light 17. The light 17 reflected from the finger 20 travels through the display panel 122, the reflective polarizer 126 or the brightness enhancement film 127, the optical diffuser 124, and the lightguide 102. The light 17 passing through the first portion 108 of the first major surface 104 of the lightguide 102 is at least partially transmitted by the transmissive reflector 112. The light 17 may then travel through the opening 120 of the frame 118 and reach the optical sensor 114. The optical sensor 114 may be configured to detect a fingerprint of the finger 20. Further, the electronic device including the display panel 122 may be configured to determine if the detected fingerprint matches a fingerprint of an authorized user.

In some embodiments, the top surface 101 of the optical construction 100 may include a predetermined sensing area where the finger 20 is placed for detection. The predetermined sensing area may be indicated by a graphic displayed by the display panel 122.

The enclosed gap 116 between the first portion 108 of the first major surface 104 of the lightguide 102 and the transmissive reflector 112 may avoid a contact between the lightguide 102 and the transmissive reflector 112 during fingerprint sensing. Specifically, the light 17 received by the optical sensor 114 may pass through the enclosed gap 116 where there is no contact between the lightguide 102 and the transmissive reflector 112. The enclosed gap 116 may therefore ensure there is no contact between the lightguide 102 and the transmissive reflector 112 in an area around the optical sensor 114 even when the finger 20 is pressed on the top surface 101 of the optical construction 100. This may prevent generation of interference patters, such as Newton's rings, and thereby ensure accurate fingerprint sensing in the electronic device including the optical construction 100.

In the illustrated embodiment of FIGS. 1A and 1B, the optical construction 100 includes a first tape 128 disposed between and engaging the first major surface 104 of the lightguide 102 and the transmissive reflector 112. The first tape 128 is disposed around the first portion 108 of the first major surface 104 of the lightguide 102, such that the enclosed gap 116 is provided between the first portion 108 and the transmissive reflector 112. In some embodiments, the first tape 128 laminates the lightguide 102 to the transmissive reflector 112. In some embodiments, the first tape 128 may be optically transparent. In some embodiments, the first tape 128 may have an optical transmittance of greater than about 80%, greater than about 90%, greater than about 98%, or greater than about 99%. In some other embodiments, the first tape 128 may not be optically transparent. In some cases, the first tape 128 may be substantially opaque with an optical absorbance of at least 80%, at least 90%, or at least 98%. In some embodiments, the first tape 128 may be a double-sided adhesive layer tape.

FIGS. 1A and 1B illustrate one optical sensor 114 and one opening 120 aligned with the optical sensor 114. In some other embodiments, the optical construction 100 may include multiple optical sensors 114 aligned with corresponding openings 120. In some embodiments, the enclosed gap 116 may have suitable dimensions to ensure light received by the multiple optical sensors 114 passes through the enclosed gap 116. In some other embodiments, multiple enclosed gaps 116 may be provided for corresponding optical sensors 114 and corresponding openings 120. The location of the multiple enclosed gaps 116 may depend on the location of the corresponding optical sensors 114 and openings 120.

Figure 1C:
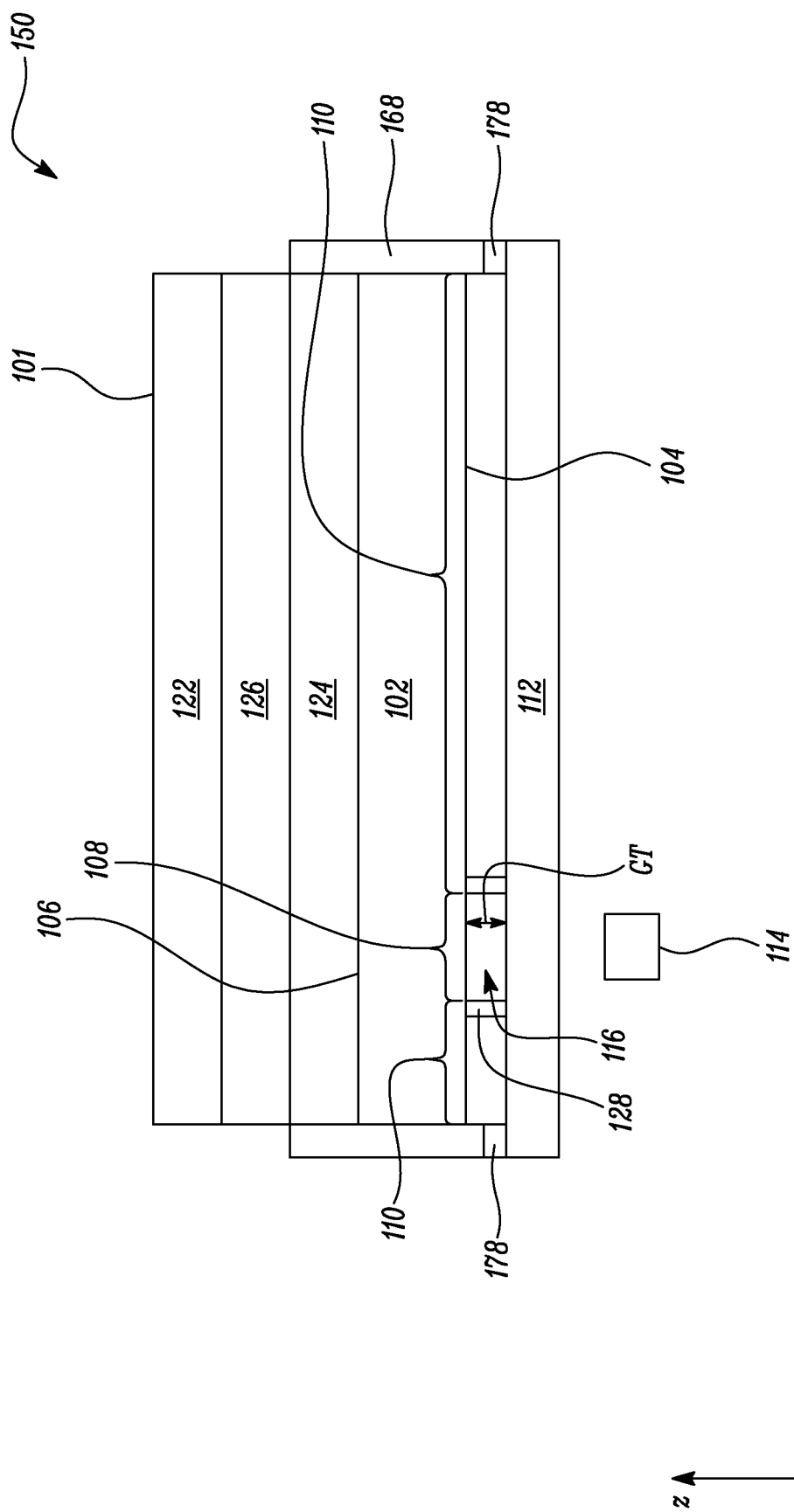
FIG. 1C shows a sectional schematic view of an optical construction according to another embodiment of the present disclosure.

FIG. 1C illustrates a schematic view of an optical construction 150 according to another embodiment of the present disclosure. The optical construction 150 is substantially similar to the optical construction 100 illustrated in FIGS. 1A and 1B. Common components between the optical constructions 100, 150 are illustrated by the same reference numerals. However, the optical construction 150 includes a frame 168 having a different configuration from the frame 118 of FIGS. 1A and 1B. Some components have also been omitted in FIG. 1C for the purpose of clarity.

The frame 168 engages the transmissive reflector 112. The frame 168 at least surrounds and extends beyond the lightguide 102. The frame 168 may extend beyond the second major surface 106 of the lightguide 102 substantially along the z-axis. In the illustrated embodiment, the frame 168 surrounds the lightguide 102 and the optical diffuser 124. In some other embodiments, the frame 168 may extend to and at least partially surround the reflective polarizer 126. In some embodiments, the frame 168 is perpendicular with respect to the transmissive reflector 112. In some other embodiments, the frame 168 may be inclined obliquely with respect to the transmissive reflector 112.

The optical construction 150 further includes a second tape 178 that laminates the frame 168 to the transmissive reflector 112. The second tape 178 may be a double-sided adhesive layer tape. In some embodiments, the second tape 178 may be optically transparent. In some embodiments, the second tape 178 may have an optical transmittance of greater than about 80%, greater than about 90%, greater than about 98%, or greater than about 99%. In some other embodiments, the second tape 178 may not be optically transparent. In some embodiments, the second tape 178 may be substantially opaque with an optical absorbance of at least 80%, at least 90%, or at least 98%.

Figure 2:
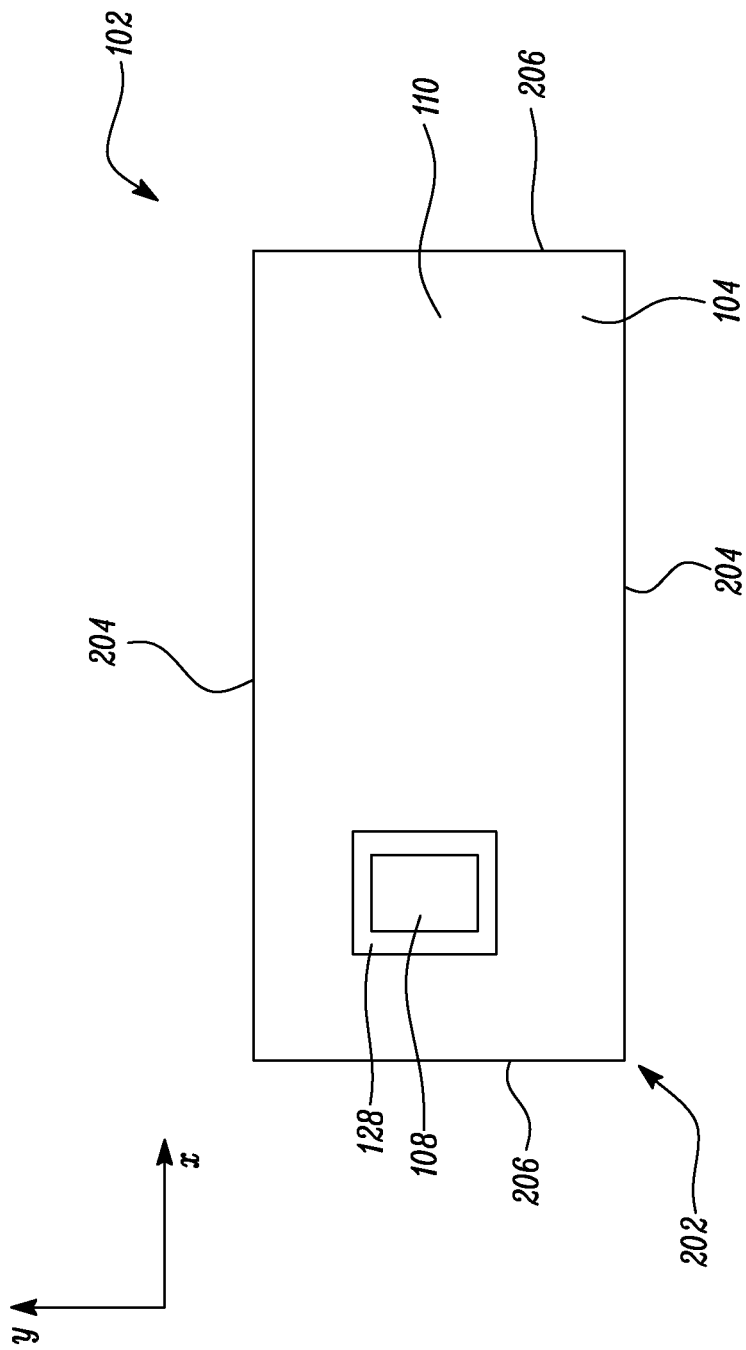
FIG. 2 is a schematic bottom view of a lightguide of the optical constructions of FIGS. 1A-1C.

FIG. 2 illustrates a bottom view of the lightguide 102. The first major surface 104 of the lightguide 102 includes the first portion 108 and the adjoining second portion 110. The first major surface 104 of the lightguide 102 further defines a continuous edge 202. The continuous edge 202 includes a pair of opposing longitudinal edges 204 and a pair of opposing transverse edges 206 perpendicular to and intersecting with the longitudinal edges 204. The pair of longitudinal edges 204 extend substantially along the x-axis and the pair of transverse edges 206 extend substantially along the y-axis. As illustrated in FIG. 2, the first tape 128 surrounds the first portion 108 of the first major surface 104 of the lightguide 102. In some embodiments, an area (i.e., the first portion 108) enclosed by the first tape 128 is less than about 5%, less than about 10%, less than about 15%, less than about 20%, less than about 25%, or less than about 30% of an area defined by the continuous edge 202. A thickness of the first tape 128 may vary as per application attributes.

Figure 3A:
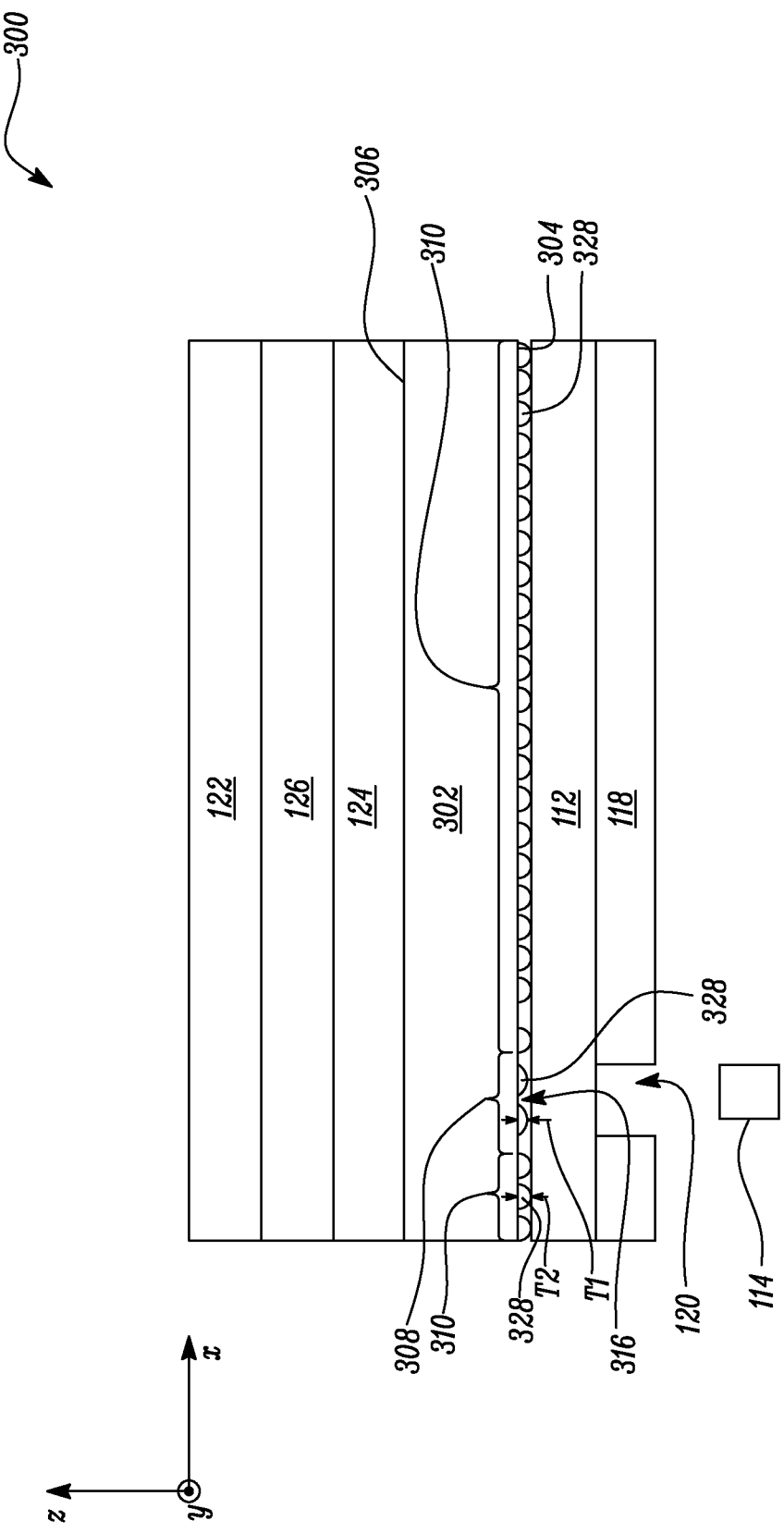
FIG. 3A is a sectional schematic view of an optical construction according to an embodiment of the present disclosure.

FIG. 3A illustrates a schematic view of an optical construction 300 according to another embodiment of the present disclosure. The optical construction 300 is substantially similar to the optical construction 100 illustrated in FIGS. 1A and 1B. Common components between the optical constructions 100, 300 are illustrated by the same reference numerals. However, the optical construction 300 includes a lightguide 302 having a different configuration from the lightguide 102 of FIGS. 1A and 1B. Some components have also been omitted in FIG. 3A for the purpose of clarity.

The lightguide 302 includes a first major surface 304 and a second major surface 306 opposite to the first major surface 304. The first major surface 304 includes a first portion 308 and an adjoining second portion 310. The lightguide 302 further includes a plurality of protrusions 328 disposed on the first major surface 304 of the lightguide 302. At least some of the protrusions 328 engage with the transmissive reflector 112. The protrusions 328 disposed on the first portion 308 of the first major surface 304 define an average thickness "T1". Further, the adjoining protrusions 328 disposed on the second portion 310 of the first major surface 304 define an average thickness "T2". The average thickness "T1" of the protrusions 328 disposed on the first portion 308 of the first major surface 304 is less than the average thickness "T2" of the adjoining protrusions 328 disposed on the second portion 310 of the first major surface 304, such that an enclosed gap 316 is provided between the first portion 308 of the first major surface 304 and the transmissive reflector 112. The average thicknesses "T1" and "T2" may be measured with reference to the first major surface 304 of the lightguide 302. In some embodiments, the average thickness "T1" of the protrusions 328 disposed on the first portion 308 is less than about 20%, less than about 30%, less than about 40%, less than about 50%, less than about 60%, less than about 70%, or less than about 80% of the average thickness "T2" of the protrusions 328 disposed on the second portion 310. In the illustrated embodiment of FIG. 3A, the protrusions 328 have a substantially hemispheric shape. In some other embodiments, the protrusions 328 may have a substantially conical shape, a substantially pyramidal shape, a substantially cuboidal shape, and so forth. The protrusions 328 may have any suitable shape as per application attributes.

Figure 3B:
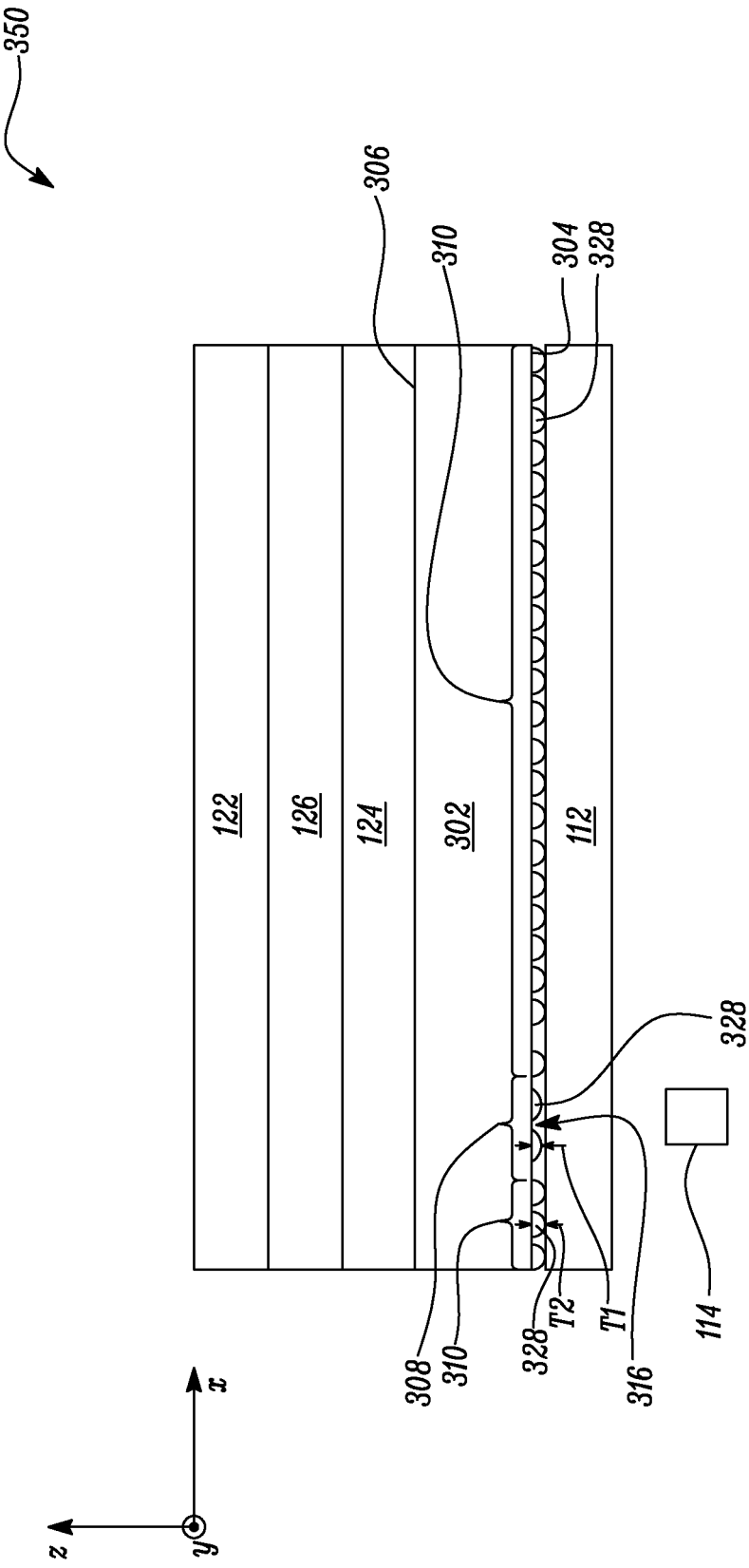
FIG. 3B is a sectional schematic view of an optical construction according to another embodiment of the present disclosure.

FIG. 3B illustrates a schematic view of an optical construction 350 according to another embodiment of the present disclosure. The optical construction 350 is substantially similar to the optical construction 300 illustrated in FIG. 3A. Common components between the optical constructions 300, 350 are illustrated by the same reference numerals. However, the optical construction 350 does not include the frame 118 of FIG. 3A. Specifically, the optical sensor 114 is disposed adjacent to the transmissive reflector 112 without any frame between the optical sensor 114 and the transmissive reflector 112. In some embodiments, the optical construction 350 may include the frame 168, as illustrated in FIG. 1C.

Figure 4A:
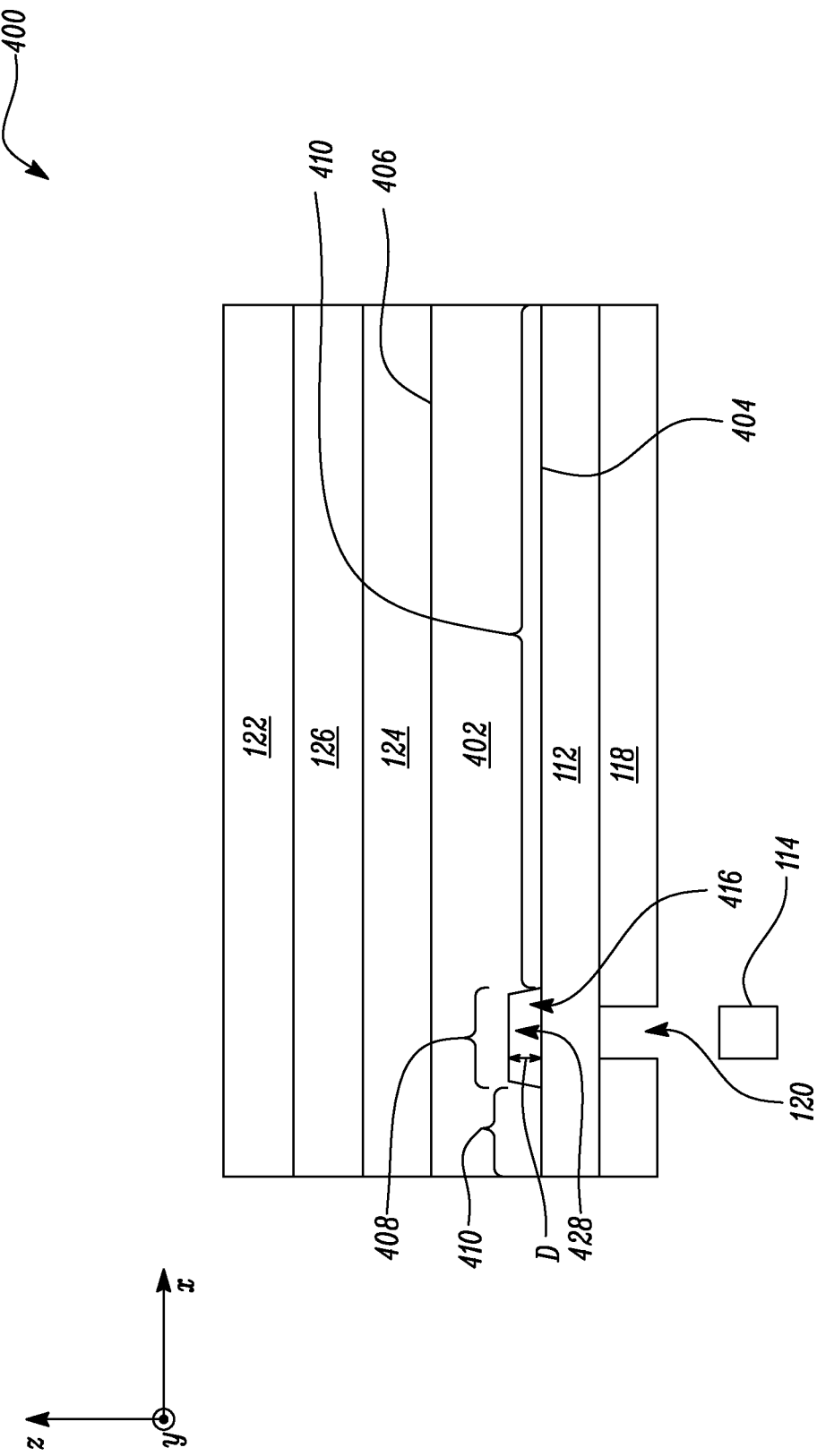
FIG. 4A is a sectional schematic view of an optical construction according to an embodiment of the present disclosure.

FIG. 4A illustrates a schematic view of an optical construction 400 according to another embodiment of the present disclosure. The optical construction 400 is substantially similar to the optical construction 100 illustrated in FIGS. 1A and 1B. Common components between the optical constructions 100, 400 are illustrated by the same reference numerals. However, the optical construction 400 includes a lightguide 402 having a different configuration from the lightguide 102 of FIGS. 1A and 1B. Some components have also been omitted in FIG. 4A for the purpose of clarity.

The lightguide 402 includes a first major surface 404 and a second major surface 406 opposite to the first major surface 404. The first major surface 404 includes a first portion 408 and an adjoining second portion 410. The lightguide 402 further defines a cavity 428 at the first portion 408 of the first major surface 404 of the lightguide 402. The cavity 428 has a depth "D" relative to the second portion 410 of the first major surface 404. In the illustrated embodiment of FIG. 4A, the cavity 428 has a substantially trapezoidal shape. In some other embodiments, the cavity 428 may have a substantially square shape, a substantially triangular shape, a substantially circular shape, or a substantially polygonal shape. The cavity 428 may have any suitable shape as per application attributes. The cavity 428 provides an enclosed gap 416 between the first portion 408 and the transmissive reflector 112.

Figure 4B:
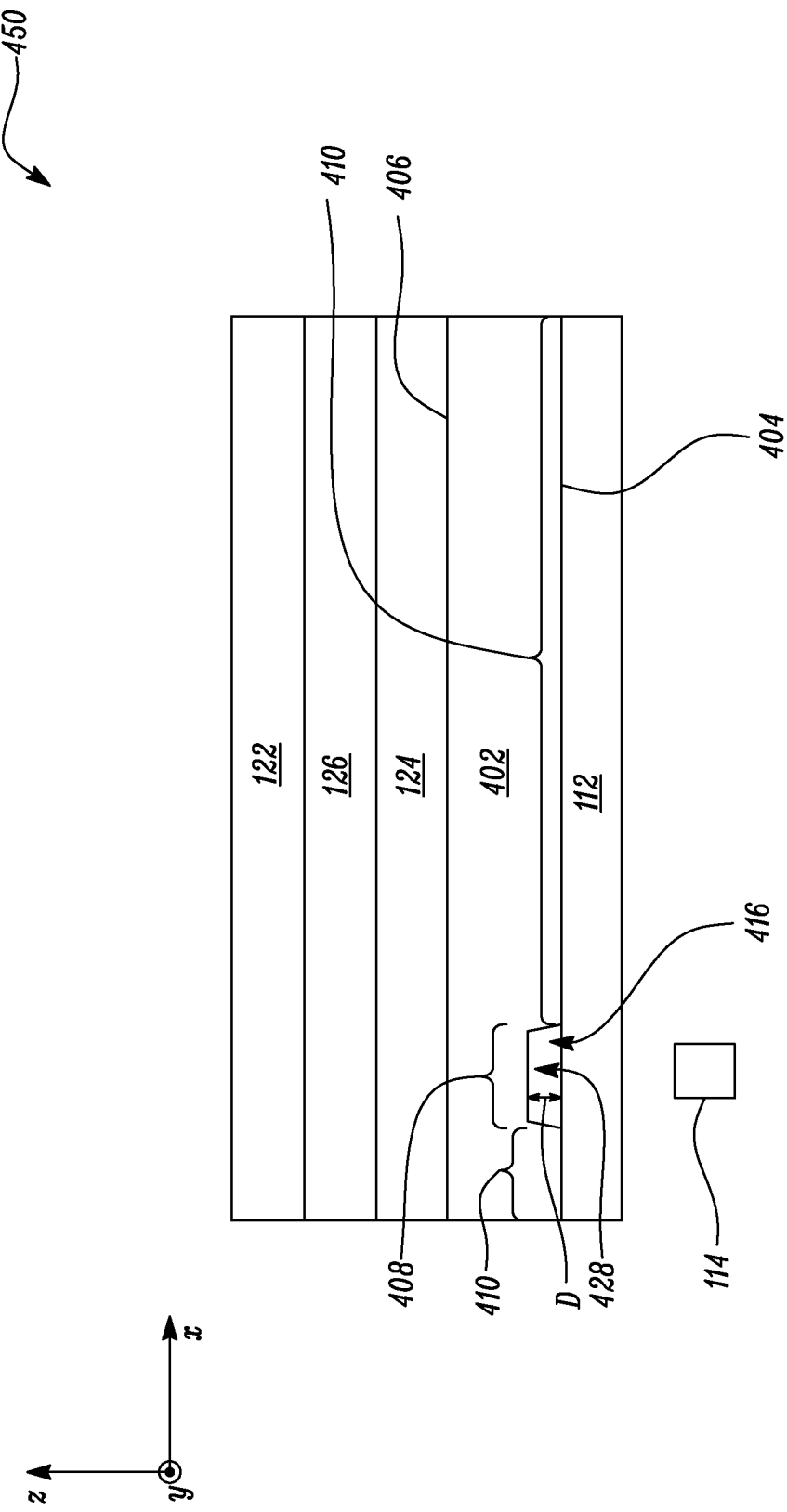
FIG. 4B is a sectional schematic view of an optical construction according to another embodiment of the present disclosure.

FIG. 4B illustrates a schematic view of an optical construction 450 according to another embodiment of the present disclosure. The optical construction 450 is substantially similar to the optical construction 400 illustrated in FIG. 4A. Common components between the optical constructions 400, 450 are illustrated by the same reference numerals. However, the optical construction 450 does not include the frame 118 of FIG. 4A. Specifically, the optical sensor 114 is disposed adjacent to the transmissive reflector 112 without any frame between the optical sensor 114 and the transmissive reflector 112. In some embodiments, the optical construction 450 may include the frame 168, as illustrated in FIG. 1C.

Figure 5A:
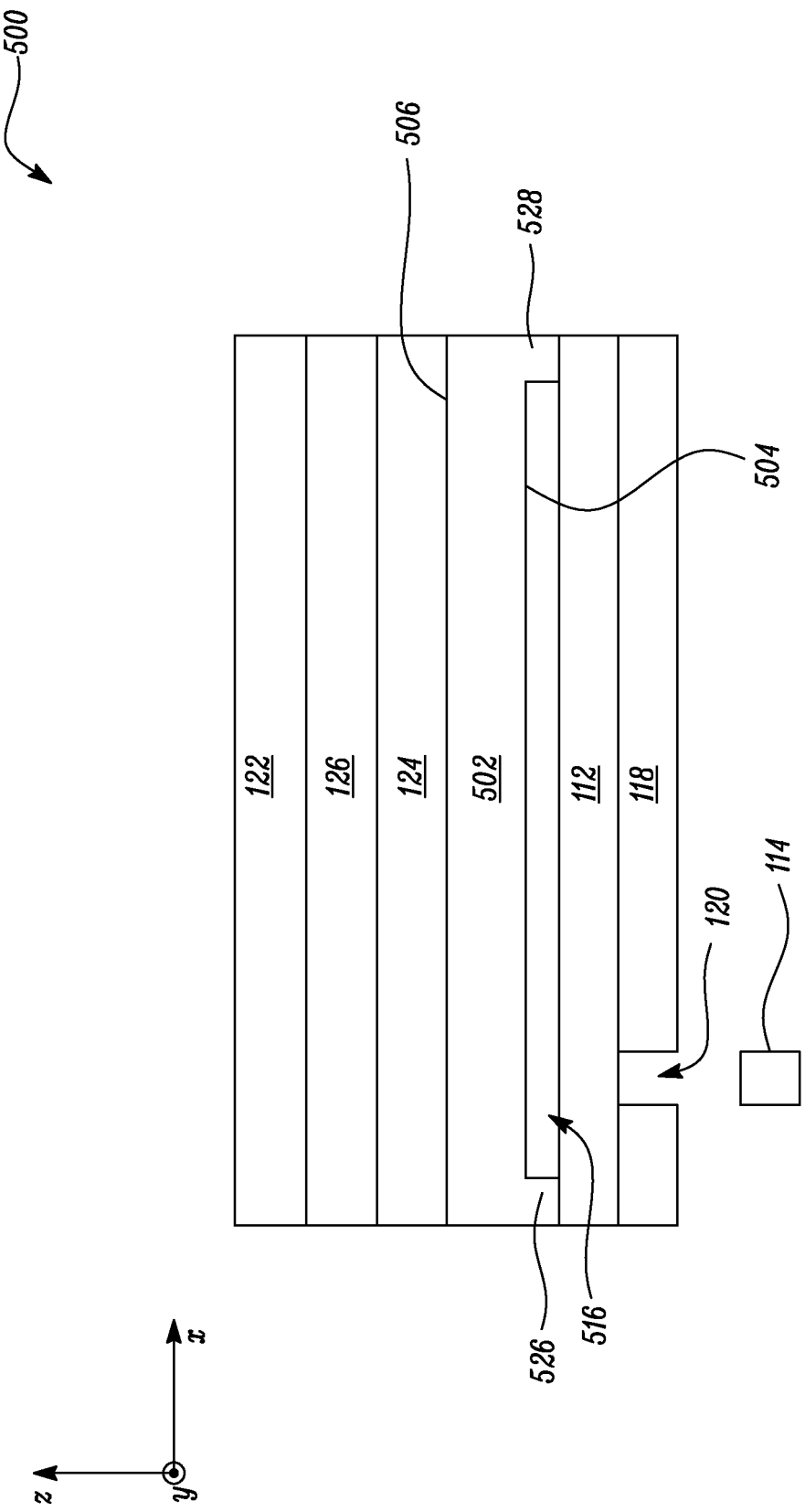
FIG. 5A is a sectional schematic view of an optical construction according to an embodiment of the present disclosure.

FIG. 5A illustrates an optical construction 500 according to another embodiment of the present disclosure. The optical construction 500 is substantially similar to the optical construction 100 illustrated in FIGS. 1A and 1B. Common components between the optical constructions 100, 500 are illustrated by the same reference numerals. However, the optical construction 500 includes a lightguide 502 having a different configuration from the lightguide 102 of FIGS. 1A and 1B. Some components have also been omitted in FIG. 5A for the purpose of clarity. The lightguide 502 includes a first major surface 504 and a second major surface 506 opposite to the first major surface 504. The first and second major surfaces 504, 506 may be substantially planar and extend along the x-y plane.

Figure 5B:
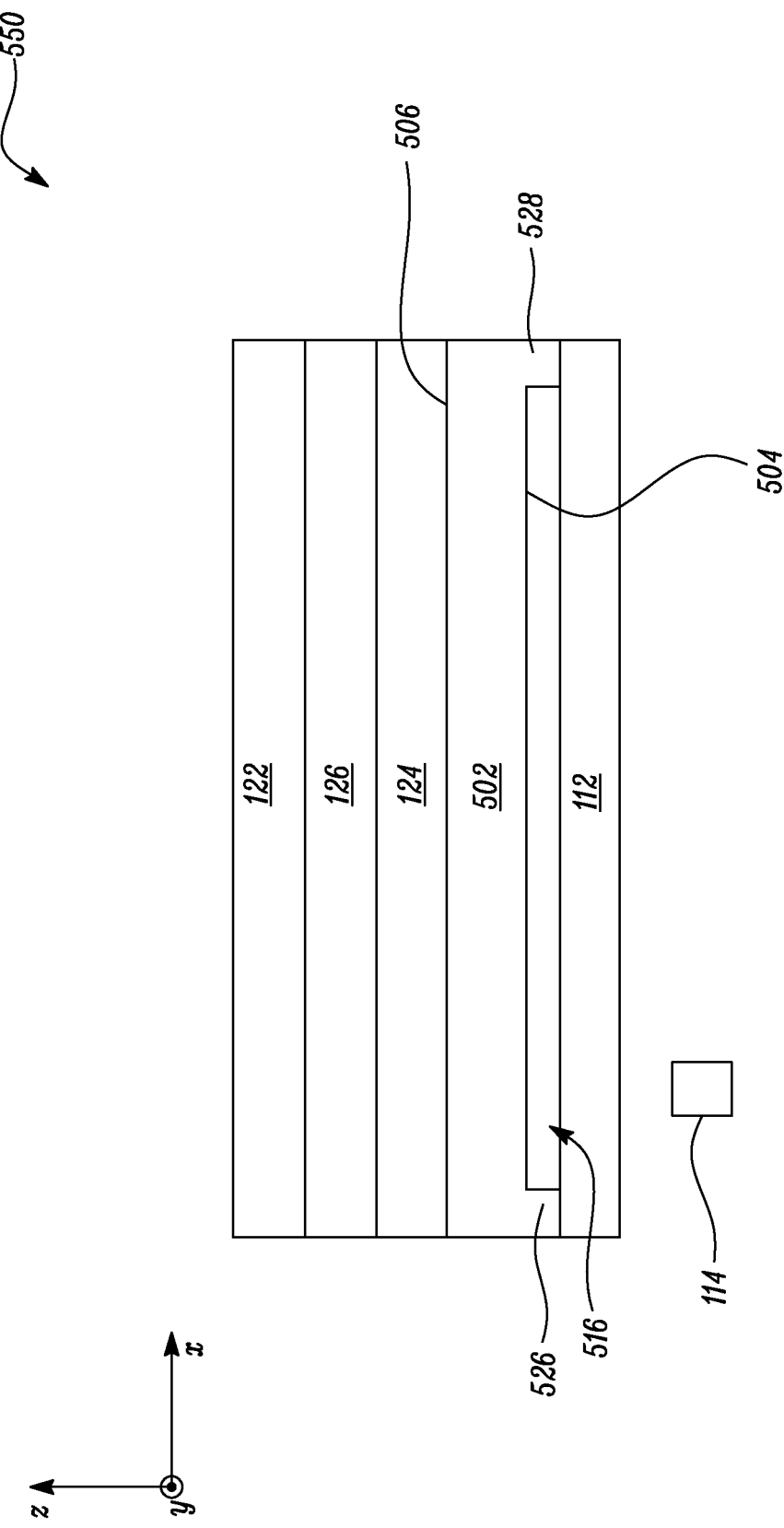
FIG. 5B is a sectional schematic view of an optical construction according to another embodiment of the present disclosure.

FIG. 5B illustrates an optical construction 550 according to another embodiment of the present disclosure. The optical construction 550 is substantially similar to the optical construction 500 illustrated in FIG. 5A. Common components between the optical constructions 500, 550 are illustrated by the same reference numerals. However, the optical construction 550 does not include the frame 118 of FIG. 5A. Specifically, the optical sensor 114 is disposed adjacent to the transmissive reflector 112 without any frame between the optical sensor 114 and the transmissive reflector 112. In some embodiments, the optical construction 550 may include the frame 168, as illustrated in FIG. 1C.

Figure 6:
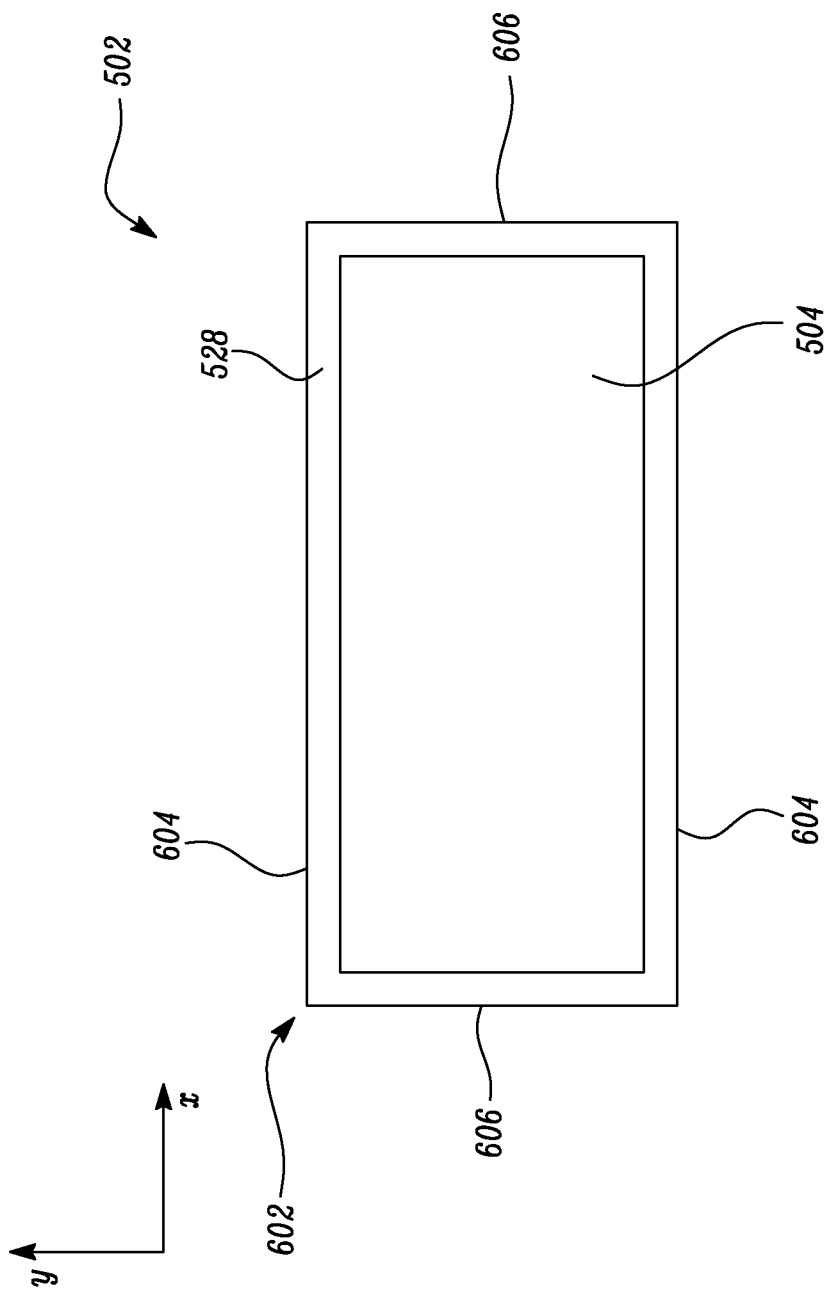
FIG. 6 is a schematic bottom view of a lightguide of the optical constructions of FIGS. 5A and 5B.

FIG. 6 illustrates a bottom view of the lightguide 502 of FIGS. 5A and 5B. The first major surface 504 of the lightguide 502 includes a continuous edge 602. The continuous edge 602 includes a pair of opposing longitudinal edges 604 and a pair of opposing transverse edges 606 perpendicular to and intersecting with the longitudinal edges 604. The pair of longitudinal edges 604 extend substantially along the x-axis and the pair of transverse edges 606 extend substantially along the y-axis.

Referring to FIGS. 5A, 5B and 6, each of the optical constructions 500, 550 further includes a spacer member 526 disposed at least partially between the first major surface 504 of the lightguide 502 and the transmissive reflector 112. The spacer member 526 engages the first major surface 504 of the lightguide 502 and the transmissive reflector 112. The spacer member 526 extends along the continuous edge 602 of the first major surface 504, such that an enclosed gap 516 is provided between the first major surface 504 of the lightguide 502 and the transmissive reflector 112. The spacer member 526 may be a continuous member that defines the enclosed gap 516.

In the embodiments illustrated in FIGS. 5A, 5B and 6, the spacer member 526 includes a wall 528 integral with the lightguide 502 and extending from the first major surface 504 of the lightguide 502. The wall 528 is disposed along the continuous edge 602 of the first major surface 504 of the lightguide 502. In some other embodiments, the spacer member 526 may not be integral with the lightguide 502. The spacer member 526 may be made of any suitable material as per application attributes.

Figure 7A:
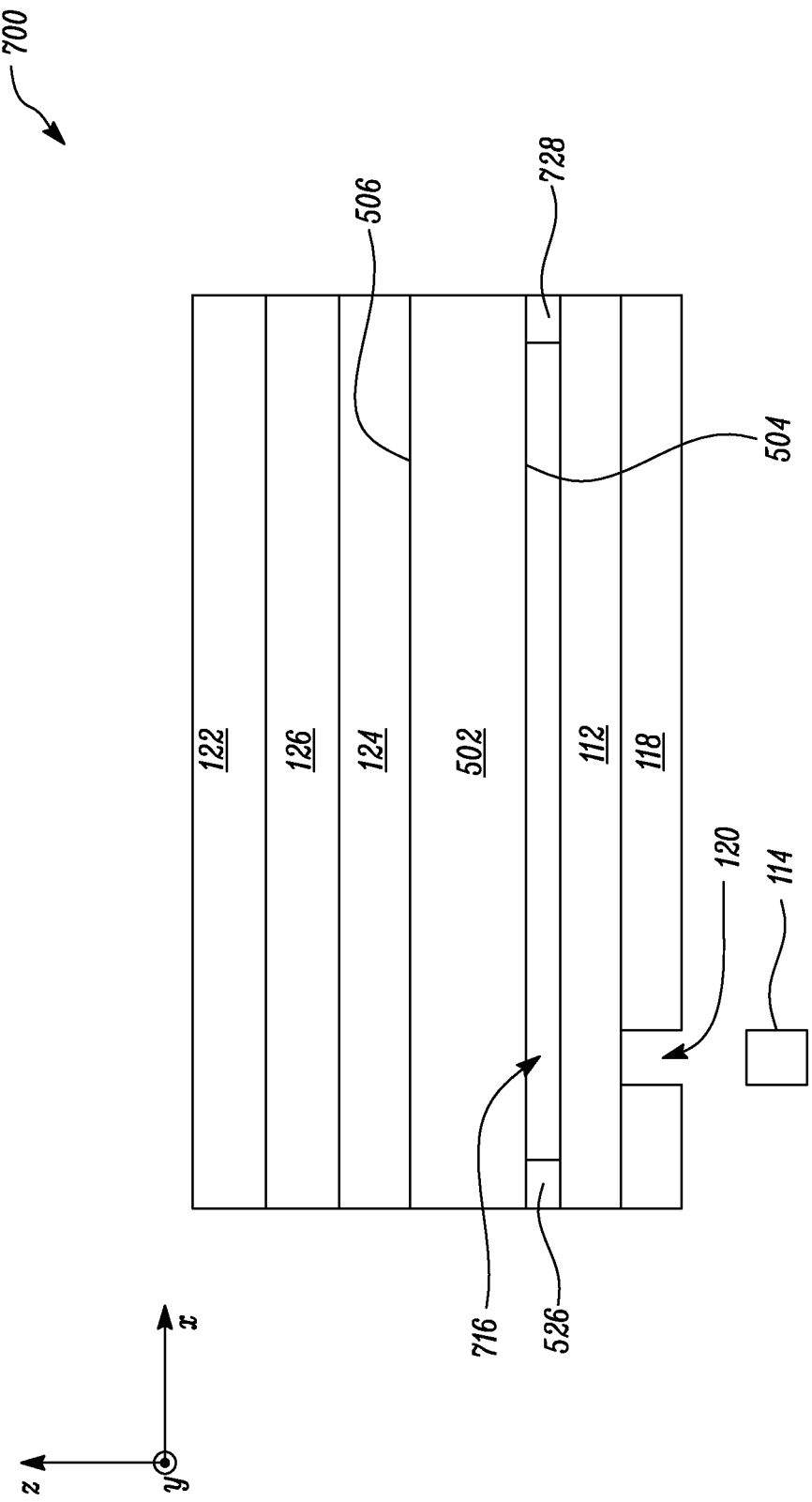
FIG. 7A is a sectional schematic view of an optical construction according to an embodiment of the present disclosure.

FIG. 7A illustrates an optical construction 700 according to another embodiment of the present disclosure. The optical construction 700 is substantially similar to the optical construction 500 illustrated in FIG. 5A. Common components between the optical constructions 500, 700 are illustrated by the same reference numerals. However, in the optical construction 700, the spacer member 526 includes a film 728, such that an enclosed gap 716 is provided between the first major surface 504 of the lightguide 502 and the transmissive reflector 112. The film 728 is separate from the lightguide 502. The film 728 may be a double-sided adhesive film. In some embodiments, the film 728 may be an optically clear adhesive film. In some other embodiments, the film 728 may be laminated between the lightguide 502 and the transmissive reflector 112.

Figure 7B:
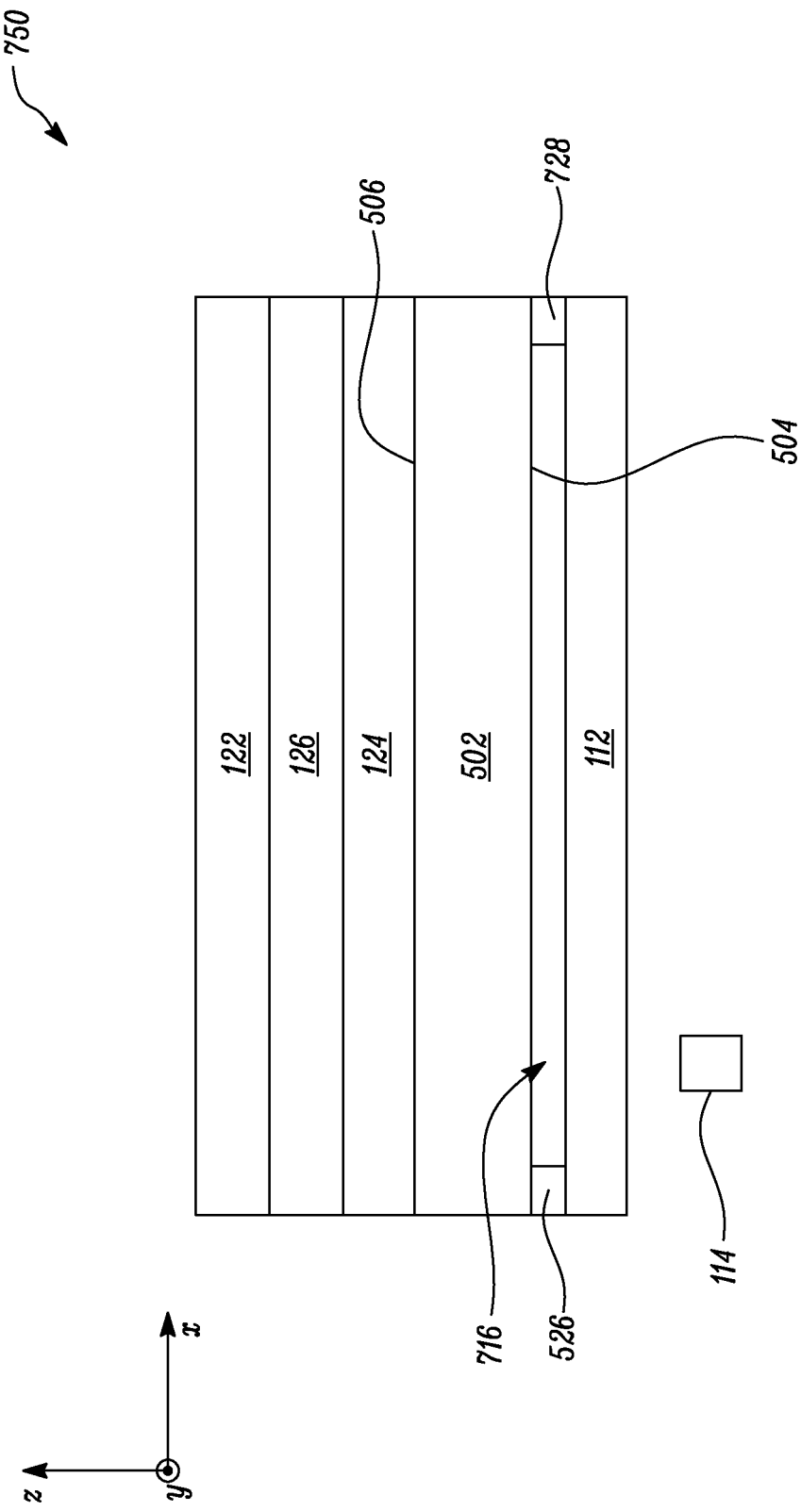
FIG. 7B is a sectional schematic view of an optical construction according to another embodiment of the present disclosure.

FIG. 7B illustrates an optical construction 750 according to another embodiment of the present disclosure. The optical construction 750 is substantially similar to the optical construction 700 illustrated in FIG. 7A. Common components between the optical constructions 700, 750 are illustrated by the same reference numerals. However, the optical construction 750 does not include the frame 118 of FIG. 7A. Specifically the optical sensor 114 is disposed adjacent to the transmissive reflector 112 without any frame between the optical sensor 114 and the transmissive reflector 112. In some embodiments, the optical construction 750 may include the frame 168, as illustrated in FIG. 1C.

Figure 8:
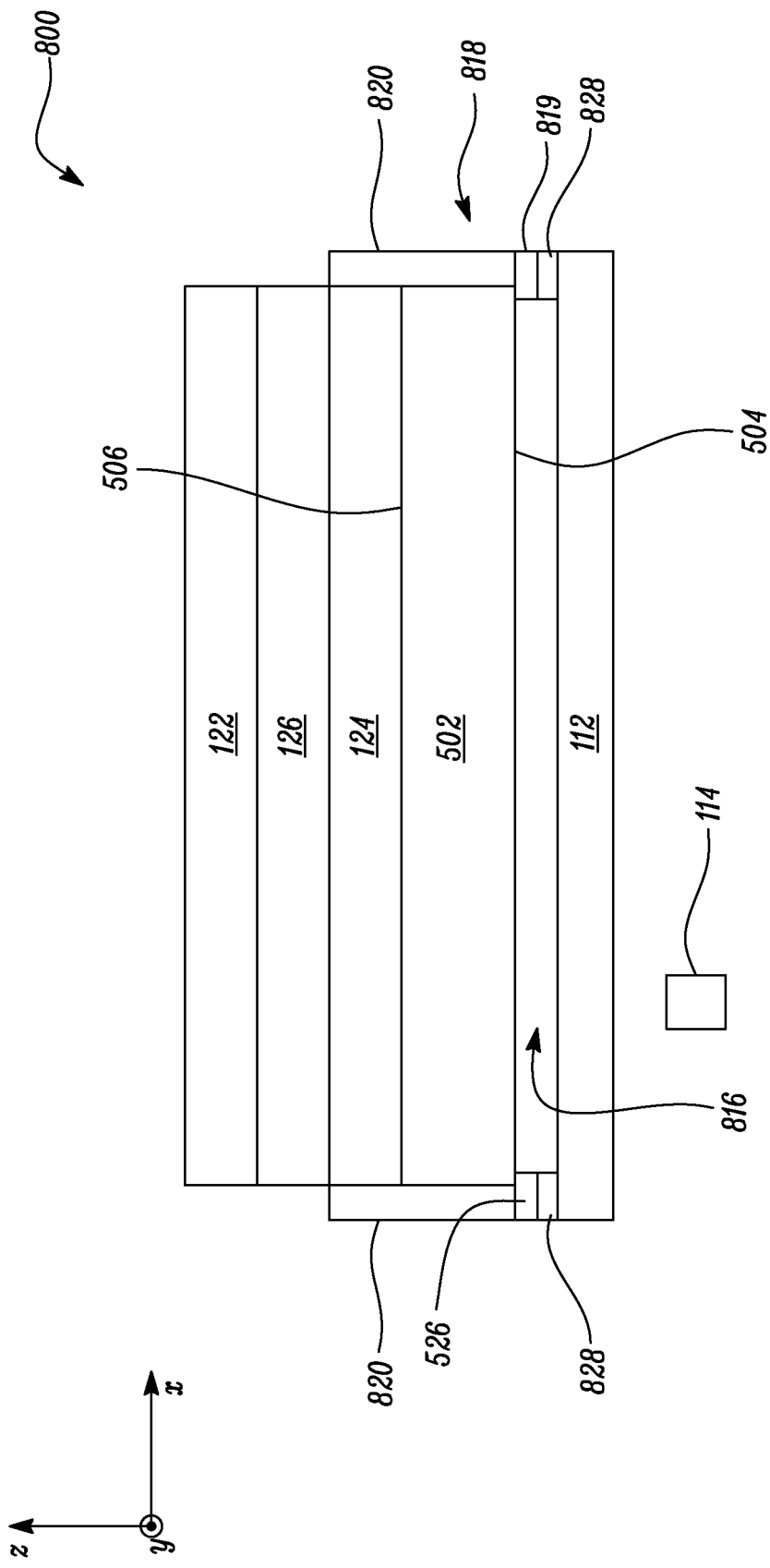
FIG. 8 is a sectional schematic view of an optical construction according to an embodiment of the present disclosure.

FIG. 8 illustrates an optical construction 800 according to another embodiment of the present disclosure. The optical construction 800 is substantially similar to the optical construction 500 illustrated in FIG. 7B. Common components between the optical constructions 750, 800 are illustrated by the same reference numerals.

The optical construction 800 further includes a frame 818. The frame 818 includes a first portion 819 forming the spacer member 526. In the illustrated embodiment, the first portion 819 engages the first major surface 504 of the lightguide 502 and the transmissive reflector 112, such that an enclosed gap 816 is provided between the first major surface 504 of the lightguide 502 and the transmissive reflector 112. The first portion 819 may be a continuous member that defines the enclosed gap 816. The optical construction 800 further includes a tape 828 that laminates the first portion 819 of the frame 818 to the transmissive reflector 112. The tape 828 may be separate from the first portion 819. The tape 828 may be a double-sided adhesive film. In some embodiments, the tape 828 may be an optically clear adhesive film.

The frame 818 further includes a second portion 820 surrounding and extending beyond the lightguide 502. More particularly, the second portion 820 extends beyond the lightguide 502 substantially along the z-axis. In some embodiments, the second portion 820 surrounds the lightguide 502, the optical diffuser 124 and the reflective polarizer 126. In some embodiments, the second portion 820 is perpendicular with respect to the transmissive reflector 112. In some other embodiments, the second portion 820 may be inclined obliquely with respect to the transmissive reflector 112.

In the embodiment illustrated in FIG. 8, the first portion 819 and the second portion 820 form an L-shape. In other words, the frame 818 has a substantially L-shaped cross-section. In some other embodiments, the first portion 819 and the second portion 820 may form a stepped portion. In some other embodiments, the first portion 819 may have a different configuration, and the frame 818 may have a different shape, as per application attributes.

Figure 9:
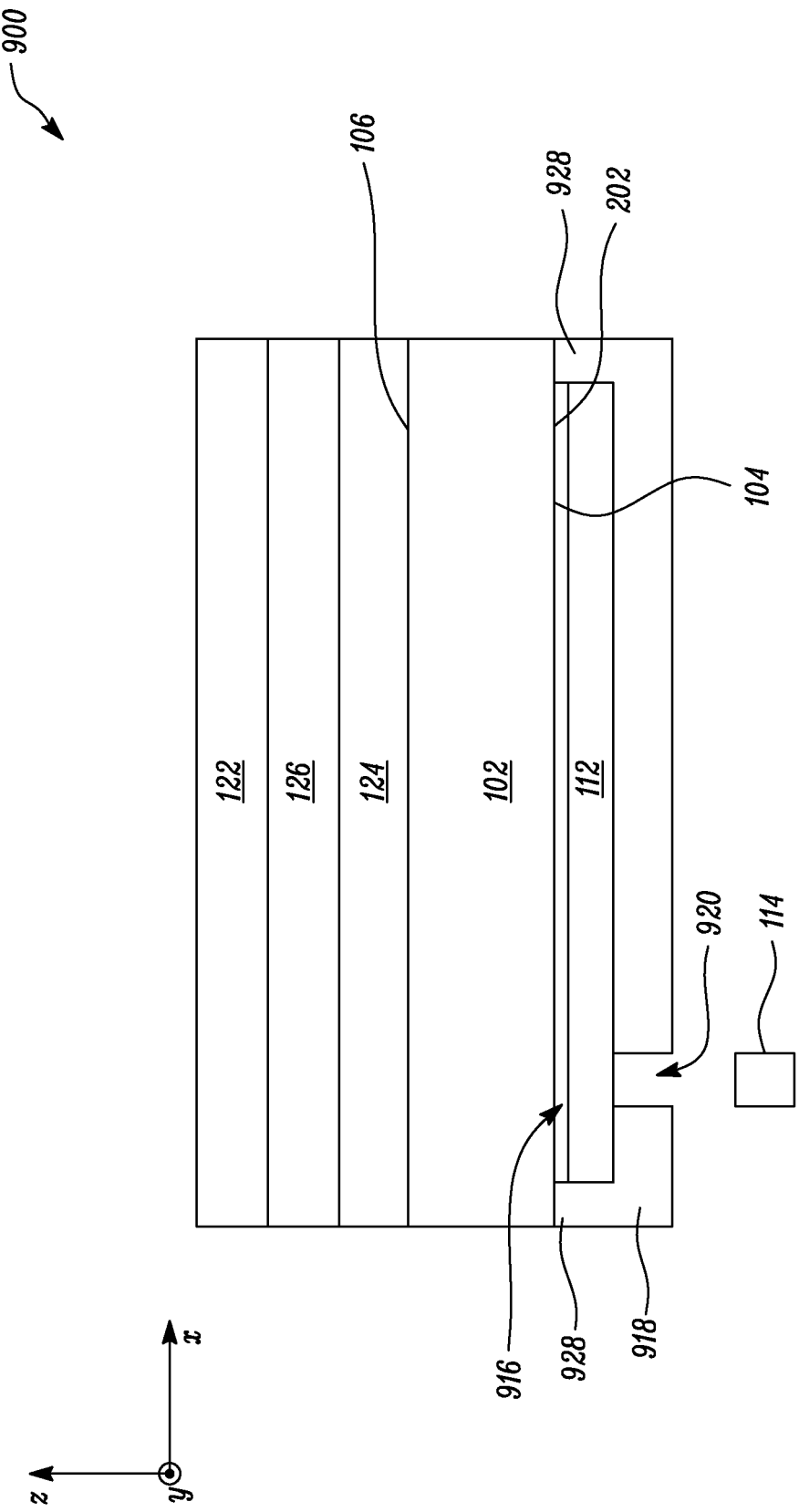
FIG. 9 is a sectional schematic view of an optical construction according to an embodiment of the present disclosure.

FIG. 9 illustrates an optical construction 900 according to another embodiment of the present disclosure. The optical construction 900 is substantially similar to the optical construction 100 illustrated in FIGS. 1A and 1B. Common components between the optical constructions 100, 900 are illustrated by the same reference numerals. However, the optical construction 900 includes a frame 918 disposed between the transmissive reflector 112 and the optical sensor 114. The frame 918 has a different configuration from the frame 118 of FIGS. 1A and 1B. Some components have been omitted in FIG. 9 for the purpose of clarity.

The frame 918 defines an opening 920 extending through the frame 918 and aligned with the optical sensor 114, such that light received by the optical sensor 114 passes through the opening 920. The frame 918 includes a wall 928 extending beyond the transmissive reflector 112. The wall 928 may extend beyond a top surface of the transmissive reflector 112 substantially along the z-axis. In some embodiments, the wall 928 is perpendicular with respect to the frame 918. In some other embodiments, the wall 928 may be inclined obliquely with respect to the frame 918.

The frame 918 engages the transmissive reflector 112 and the first major surface 104 of the lightguide 102 along the continuous edge 202 (shown in FIG. 2), such that an enclosed gap 916 is provided between the first major surface 104 of the lightguide 102 and the transmissive reflector 112. In some embodiments, the transmissive reflector 112 is surrounded by the wall 928 of the frame 918. The wall 928 may be a continuous wall that defines the enclosed gap 916.

Figure 10:
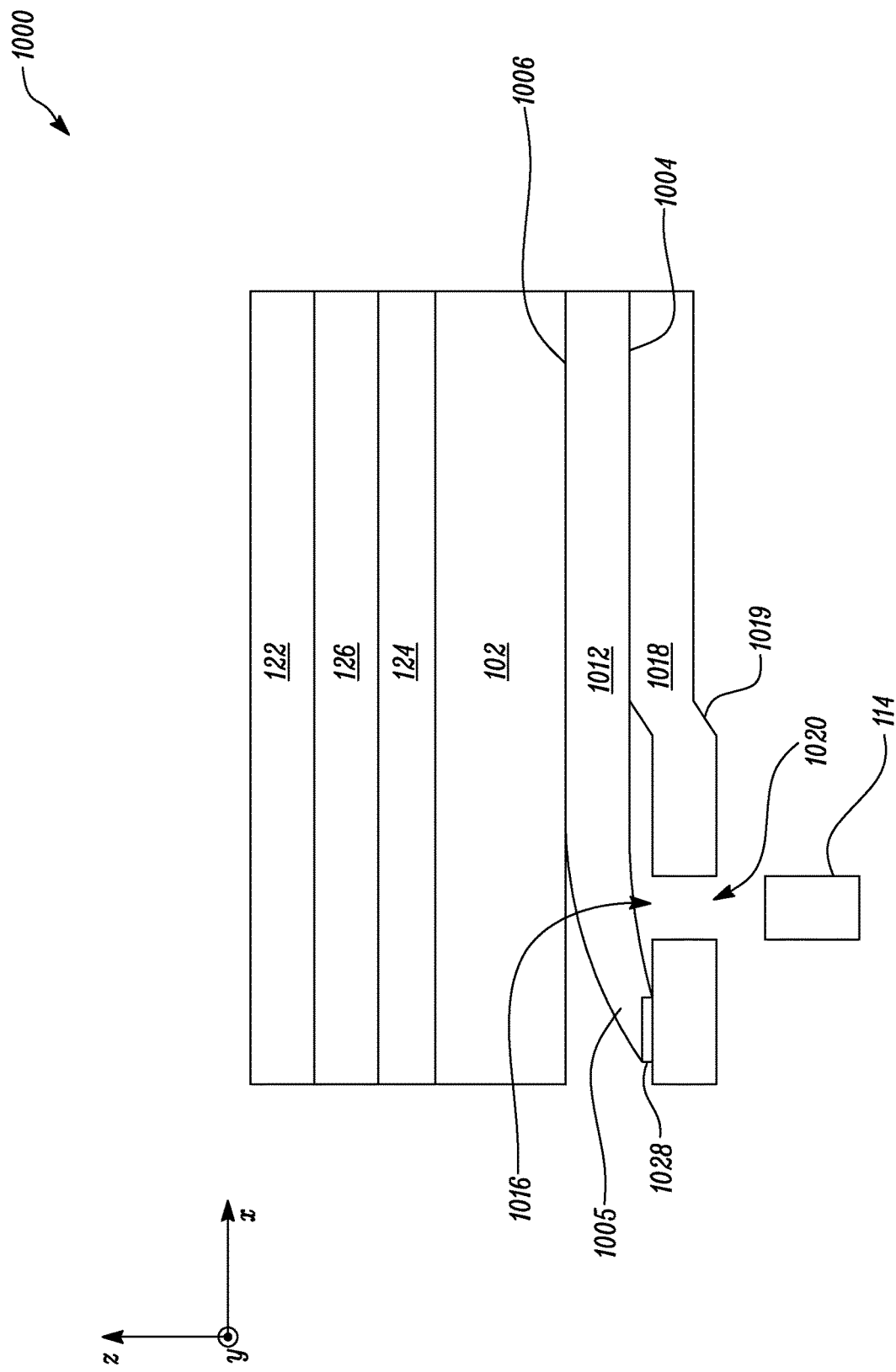
FIG. 10 is a sectional schematic view of an optical construction according to an embodiment of the present disclosure.

FIG. 10 illustrates an optical construction 1000 according to another embodiment of the present disclosure. The optical construction 1000 is substantially similar to the optical construction 100 illustrated in FIGS. 1A and 1B. Common components between the optical constructions 100, 1000 are illustrated by the same reference numerals. However, the optical construction 1000 includes a transmissive reflector 1012 and a frame 1018 having different configurations from the transmissive reflector 112 and the frame 118, respectively, of FIGS. 1A and 1B. Some components have been omitted in FIG. 10 for the purpose of clarity.

The transmissive reflector 1012 includes a first major surface 1004, a second major surface 1006 opposite to the first major surface 1004, and a curved portion 1005. The optical sensor 114 is disposed adjacent to the first major surface 1004 of the transmissive reflector 1012 and aligned with the curved portion 1005 of the transmissive reflector 1012, such that the optical sensor 114 receives at least a portion of light transmitted by the transmissive reflector 1012 through the curved portion 1005. The lightguide 102 is disposed adjacent to the second major surface 1006 of the transmissive reflector 1012. The display panel 122 is disposed adjacent to the lightguide 102 opposite to the transmissive reflector 1012. The optical diffuser 124 and the reflective polarizer 126 are disposed between the display panel 122 and the lightguide 102.

The frame 1018 is disposed between the transmissive reflector 1012 and the optical sensor 114. The frame 1018 defines an opening 1020 extending through the frame 1018. The opening 1020 is aligned with the optical sensor 114, such that light received by the optical sensor 114 passes through the opening 1020. Furthermore, the frame 1018 includes a stepped portion 1019 extending away from the transmissive reflector 1012. In the illustrated embodiment of FIG. 10, the stepped portion 1019 extending away from the transmissive reflector 1012 is inclined at an inclination angle relative to the frame 1018. In some embodiments, the inclination angle is about 150 degrees. In some other embodiments, the inclination angle may be about 90 degrees. In some embodiments, the inclination angle may be greater than about 90 degrees.

As shown in FIG. 10, the curved portion 1005 of the transmissive reflector 1012 curves towards and engages the frame 1018, such that an enclosed gap 1016 is disposed between the curved portion 1005 of the transmissive reflector 1012 and the frame 1018. The enclosed gap 1016 is aligned with the opening 1020 of the frame 1018, such that light received by the optical sensor 114 passes through the enclosed gap 1016. In some embodiments, the curved portion 1005 may be substantially concave relative to the frame 1018. In the illustrated embodiment of FIG. 10, the curved portion 1005 extends from a substantially linear portion of the transmissive reflector 1012.

In the illustrated embodiment, the optical construction 1000 further includes a tape 1028 that laminates the curved portion 1005 of the transmissive reflector 1012 to the frame 1018. The tape 1028 may be a double-sided adhesive layer tape. In some embodiments, the tape 1028 is optically transparent. In some embodiments, the tape 1028 may have an optical transmittance of greater than about 80%, greater than about 90%, greater than about 98%, or greater than about 99%. In some other embodiments, the tape 1028 may not be optically transparent.

Figure 11:
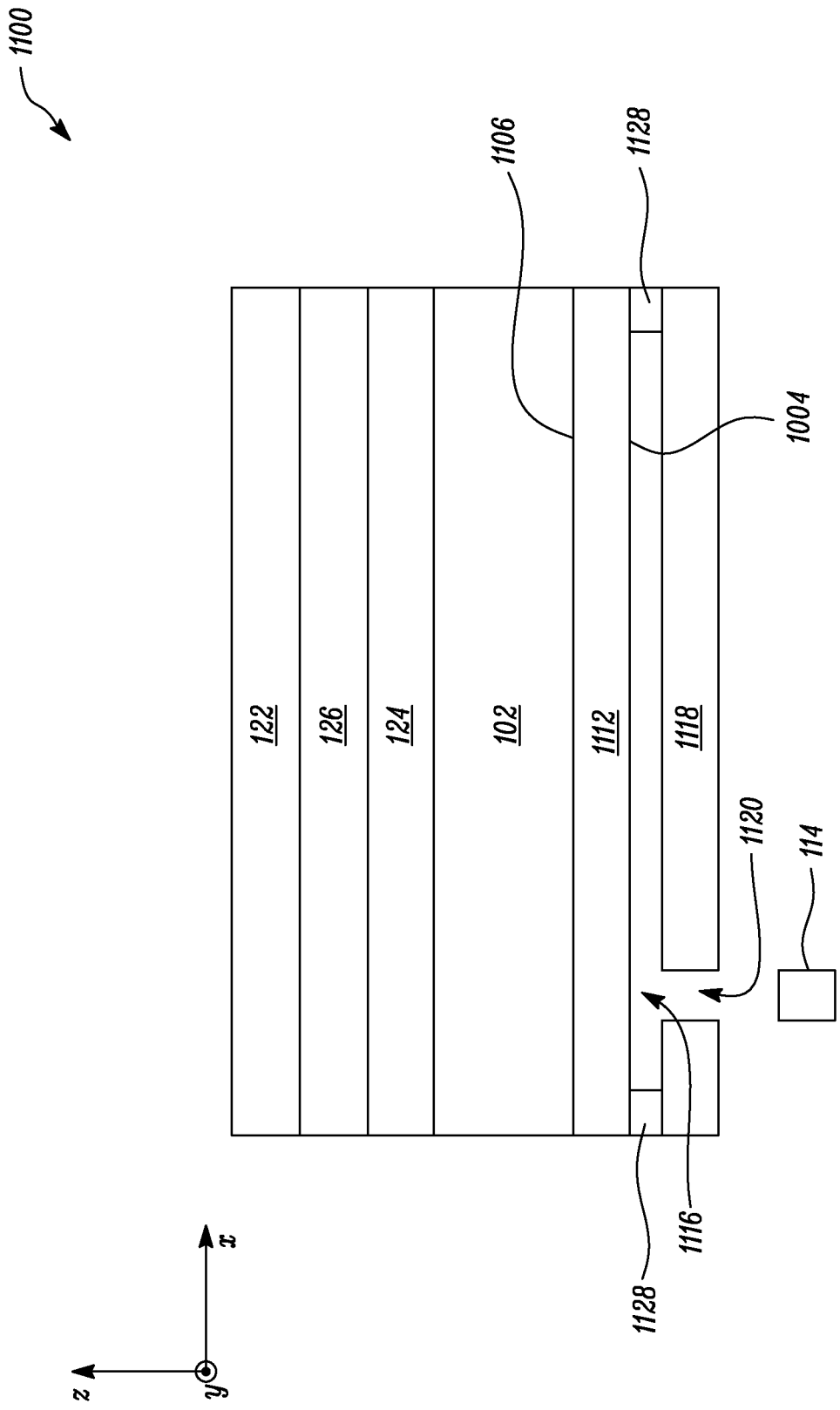
FIG. 11 is a sectional schematic view of an optical construction according to an embodiment of the present disclosure.
Figure 13:
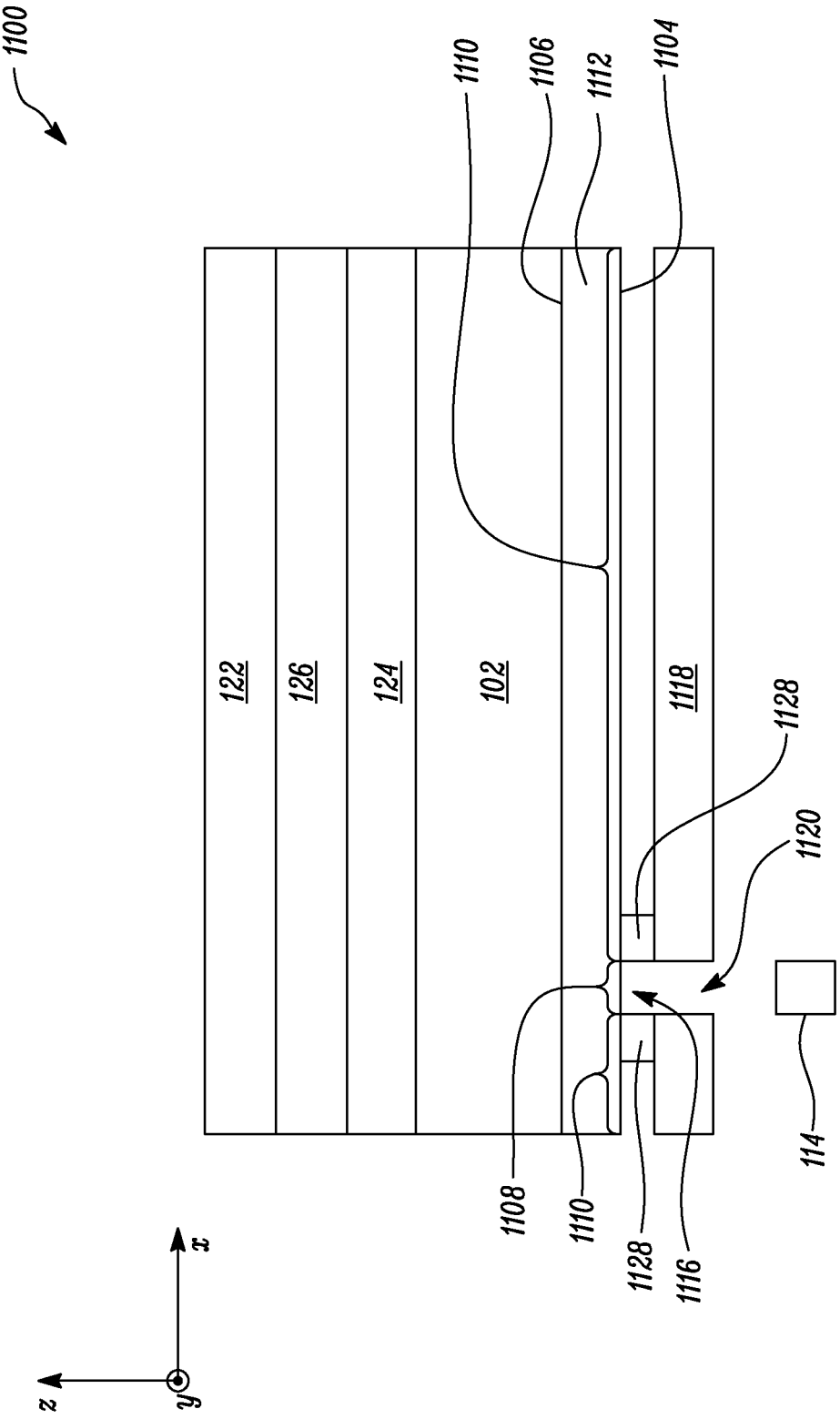
FIG. 13 is a sectional schematic view of an optical construction according to an embodiment of the present disclosure.

FIGS. 11 and 13 illustrate an optical construction 1100 according to another embodiment of the present disclosure. The optical construction 1100 is substantially similar to the optical construction 100 illustrated in FIGS. 1A and 1B.

Common components between the optical constructions 100, 1100 are illustrated by the same reference numerals. However, the optical construction 1100 includes a transmissive reflector 1112 and a frame 1118 having different configurations from the transmissive reflector 112 and the frame 118, respectively, of FIGS. 1A and 1B. Some components have been omitted in FIG. 11 for the purpose of clarity.

The transmissive reflector 1112 includes a first major surface 1104 and a second major surface 1106 opposite to the first major surface 1104. The optical sensor 114 is disposed adjacent to the first major surface 1104 of the transmissive reflector 1112. The optical sensor 114 receives at least a portion of light transmitted by the transmissive reflector 1112.

The frame 1118 is disposed between the transmissive reflector 1112 and the optical sensor 114. The frame 1118 defines an opening 1120 extending through the frame 1118. The opening 1120 is aligned with the optical sensor 114, such that light received by the optical sensor 114 passes through the opening 1120. The lightguide 102 is disposed adjacent to the second major surface 1106 of the transmissive reflector 1112.

The optical construction 1100 further includes a tape 1128 disposed between and engaging the transmissive reflector 1112 and the frame 1118, such that an enclosed gap 1116 is provided between the first major surface 1104 of the transmissive reflector 1112 and the frame 1118. In some embodiments, the tape 1128 laminates the transmissive reflector 1112 to the frame 1118. In some embodiments, the tape 1128 may be a double-sided adhesive layer tape. In some embodiments, the tape 1128 is optically transparent. In some embodiments, the tape 1128 may have an optical transmittance of greater than about 80%, greater than about 90%, greater than about 98%, or greater than about 99%. In some other embodiments, the tape 1128 may not be optically transparent.

Figure 12:
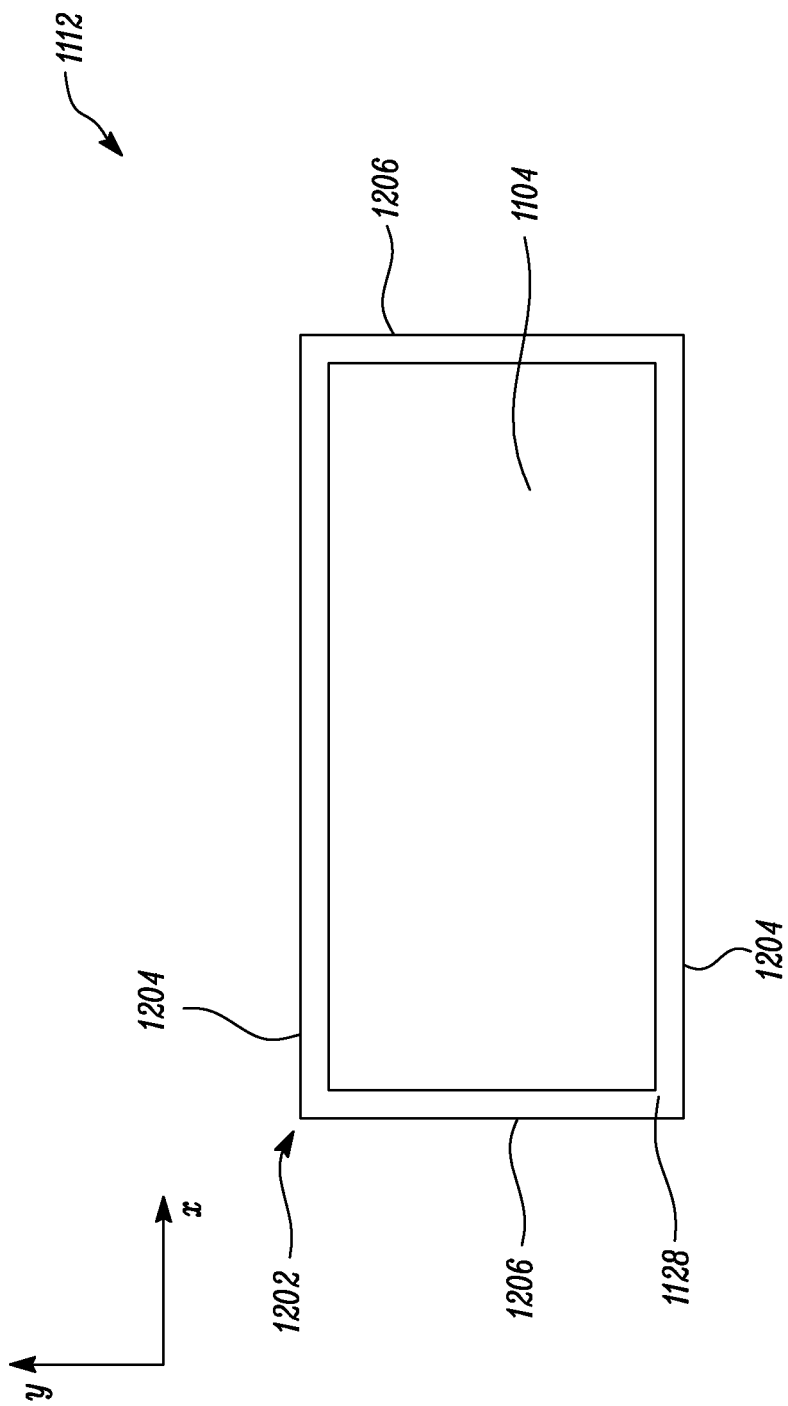
FIG. 12 is a schematic bottom view of a transmissive reflector of the optical construction of FIG. 11.

FIG. 12 illustrates a bottom view of the transmissive reflector 1112 of FIG. 11. The first major surface 1104 of the transmissive reflector 1112 includes a continuous edge 1202. The continuous edge 1202 includes a pair of opposing longitudinal edges 1204 and a pair of opposing transverse edges 1206 perpendicular to and intersecting with the longitudinal edges 1204. The pair of longitudinal edges 1204 extend substantially along the x-axis and the pair of transverse edges 1206 extend substantially along the y-axis.

The tape 1128 extends along the continuous edge 1202 of the first major surface 1104 of the transmissive reflector 1112. The tape 1128 may be a continuous member that defines the enclosed gap 1116 shown in FIG. 11.

Figure 14:
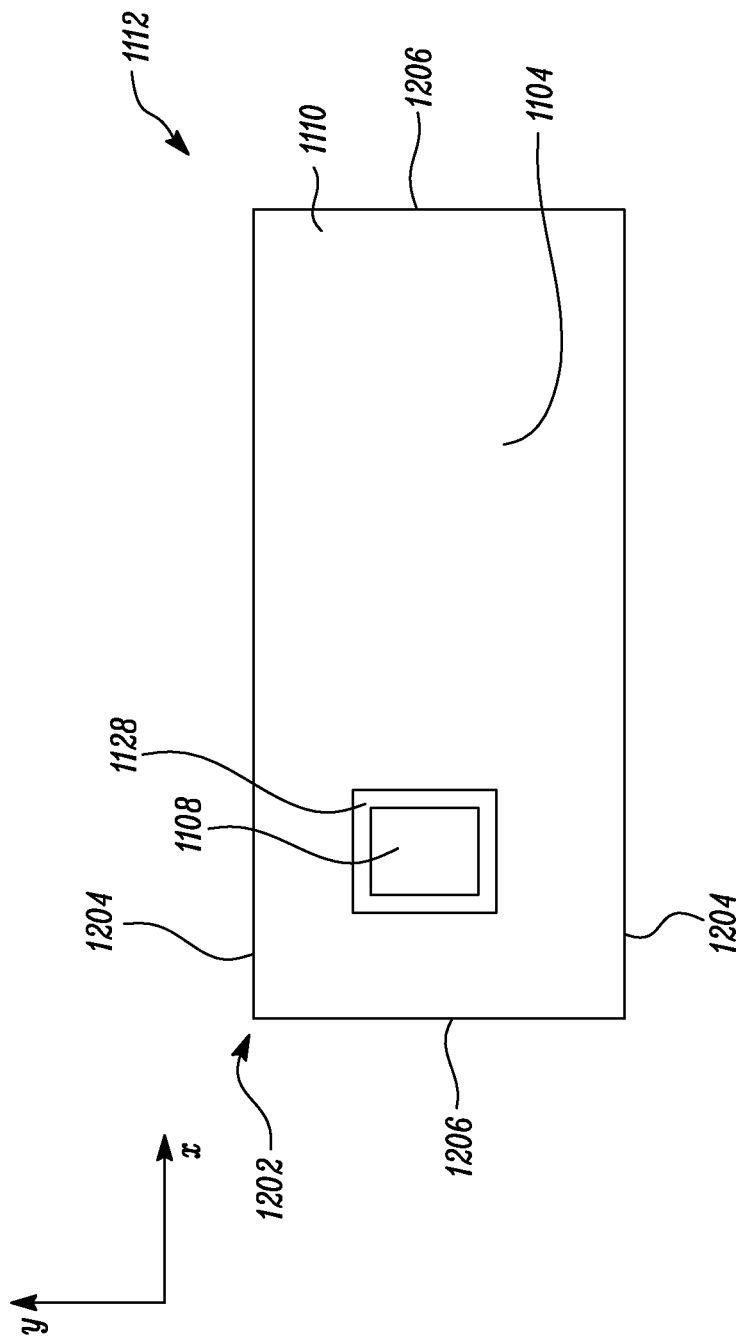
FIG. 14 is a schematic bottom view of a transmissive reflector of the optical construction of FIG. 13.

FIGS. 13 and 14 illustrate another embodiment of the optical construction 1100. In this embodiment, the first major surface 1104 of the transmissive reflector 1112 includes a first portion 1108 aligned with the opening 1120 of the frame 1118 and an adjoining second portion 1110. As shown in FIGS. 13 and 14, the tape 1128 is disposed around the first portion 1108, such that the enclosed gap 1116 is provided between the first portion 1108 of the first major surface 1104 and the frame 1118.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical construction comprising:
    a lightguide comprising a first major surface and a second major surface opposite to the first major surface, the first major surface of the lightguide comprising a first portion and an adjoining second portion;
    a transmissive reflector disposed adjacent to the first major surface of the lightguide, wherein the transmissive reflector substantially reflects light in a first wavelength range and substantially transmits light in a second wavelength range;
    an optical sensor disposed adjacent to the transmissive reflector opposite to the lightguide, wherein the optical sensor is aligned with the first portion of the first major surface of the lightguide, such that the optical sensor receives at least a portion of light passing through the first portion of the first major surface and transmitted by the transmissive reflector; and
    an enclosed gap disposed between the first portion of the first major surface of the lightguide and the transmissive reflector, such that light received by the optical sensor passes through the enclosed gap, wherein the lightguide further comprises a plurality of protrusions disposed on the first major surface of the lightguide, at least some of the protrusions engaging the transmissive reflector, wherein an average thickness of the protrusions disposed on the first portion of the first major surface is less than the average thickness of the adjoining protrusions disposed on the second portion of the first major surface, such that the enclosed gap is provided between the first portion and the transmissive reflector.

2. An optical construction comprising:
    a lightguide comprising a first major surface and a second major surface opposite to the first major surface, the first major surface of the lightguide comprising a first portion and an adjoining second portion;
    a transmissive reflector disposed adjacent to the first major surface of the lightguide, wherein the transmissive reflector substantially reflects light in a first wavelength range and substantially transmits light in a second wavelength range;
    an optical sensor disposed adjacent to the transmissive reflector opposite to the lightguide, wherein the optical sensor is aligned with the first portion of the first major surface of the lightguide, such that the optical sensor receives at least a portion of light passing through the first portion of the first major surface and transmitted by the transmissive reflector; and
    an enclosed gap disposed between the first portion of the first major surface of the lightguide and the transmissive reflector, such that light received by the optical sensor passes through the enclosed gap, wherein the lightguide further defines a cavity at the first portion of the first major surface of the lightguide, the cavity having a depth relative to the second portion of the first major surface, the cavity providing the enclosed gap between the first portion and the transmissive reflector.

3. The optical construction of claim 1, further comprising a display panel disposed adjacent to the second major surface of the lightguide opposite to the transmissive reflector, an optical diffuser disposed between the display panel and the lightguide, a reflective polarizer disposed between the display panel and the optical diffuser, and a brightness enhancement film disposed between the display panel and the optical diffuser.

4. The optical construction of claim 1, wherein the first wavelength range is a visible wavelength range extending from about 400 nm to about 700 nm, and the second wavelength range is an infrared wavelength range extending from about 700 nm to about 1000 nm.

5. The optical construction of claim 1, wherein the enclosed gap is an air gap, and a thickness of the enclosed gap is from about 2 microns to about 200 microns.

6. The optical construction of claim 1, wherein the optical sensor is an infrared sensor, and wherein the optical construction further comprises at least one first light source emitting light in the first wavelength range and at least one second light source emitting light in the second wavelength range.

* * * * *